United States Patent [19]
Force et al.

[11] Patent Number: 5,533,123
[45] Date of Patent: Jul. 2, 1996

[54] PROGRAMMABLE DISTRIBUTED PERSONAL SECURITY

[75] Inventors: Gordon Force, San Jose, Calif.;
Timothy D. Davis, Arlington, Tex.;
Richard L. Duncan, Bedford, Tex.;
Thomas M. Norcross, Arlington, Tex.;
Michael J. Shay, Arlington, Tex.;
Timothy A. Short, Duncanville, Tex.

[73] Assignee: National Semiconductor Corporation, Santa Clara, Calif.

[21] Appl. No.: 267,788

[22] Filed: Jun. 28, 1994

[51] Int. Cl.⁶ .................................................. H04L 9/00
[52] U.S. Cl. .................................................. 380/4; 380/52
[58] Field of Search ........................................ 380/3, 4, 52

[56] References Cited

U.S. PATENT DOCUMENTS

| | | | |
|---|---|---|---|
| 4,446,475 | 5/1984 | Gercekci et al. | 357/40 |
| 4,521,853 | 6/1985 | Guttag et al. | 364/200 |
| 4,593,384 | 6/1986 | Kleijne | 365/228 |
| 4,598,170 | 7/1986 | Piosenka et al. | 178/22.08 |
| 4,691,350 | 9/1987 | Kleijne et al. | 380/3 |
| 4,764,959 | 8/1988 | Watanabe et al. | 380/4 |
| 4,783,801 | 11/1988 | Kaule | 380/3 |
| 4,807,284 | 2/1989 | Kleijne | 380/3 |
| 4,811,288 | 3/1989 | Kleijne et al. | 365/52 |
| 4,860,351 | 8/1989 | Weingart | 380/3 |
| 4,926,388 | 5/1990 | Kunita et al. | 365/244 |
| 4,933,898 | 6/1990 | Gilberg et al. | 365/53 |
| 5,027,397 | 6/1991 | Double et al. | 380/4 |
| 5,053,992 | 10/1991 | Gilberg et al. | 365/53 |
| 5,083,293 | 1/1992 | Gilberg et al. | 365/189.01 |
| 5,117,457 | 5/1992 | Comerford et al. | 380/3 |
| 5,159,629 | 10/1992 | Double et al. | 380/4 |
| 5,185,717 | 2/1993 | Mori | 365/52 |
| 5,353,350 | 10/1994 | Unsworth et al. | 380/3 |

*Primary Examiner*—David C. Cain

[57] ABSTRACT

The present invention is embodied in a Secured Processing Unit (SPU) chip, a microprocessor designed especially for secure data processing. By integrating keys, encryption/decryption engines and algorithms in the SPU, the entire security process is rendered portable and easily distributed across physical boundaries. The invention is based on the orchestration of three interrelated systems: (i) detectors, which alert the SPU to the existence, and help characterize the nature, of a security attack; (ii) filters, which correlate the data from the various detectors, weighing the severity of the attack against the risk to the SPU's integrity, both to its secret data and to the design itself; and (iii) responses, which are countermeasures, calculated by the filters to be most appropriate under the circumstances, to deal with the attack or attacks present. The present invention, with wide capability in all three of the detectors, filters and responses, allows a great degree of flexibility for programming an appropriate level of security/policy into an SPU-based application.

14 Claims, 19 Drawing Sheets

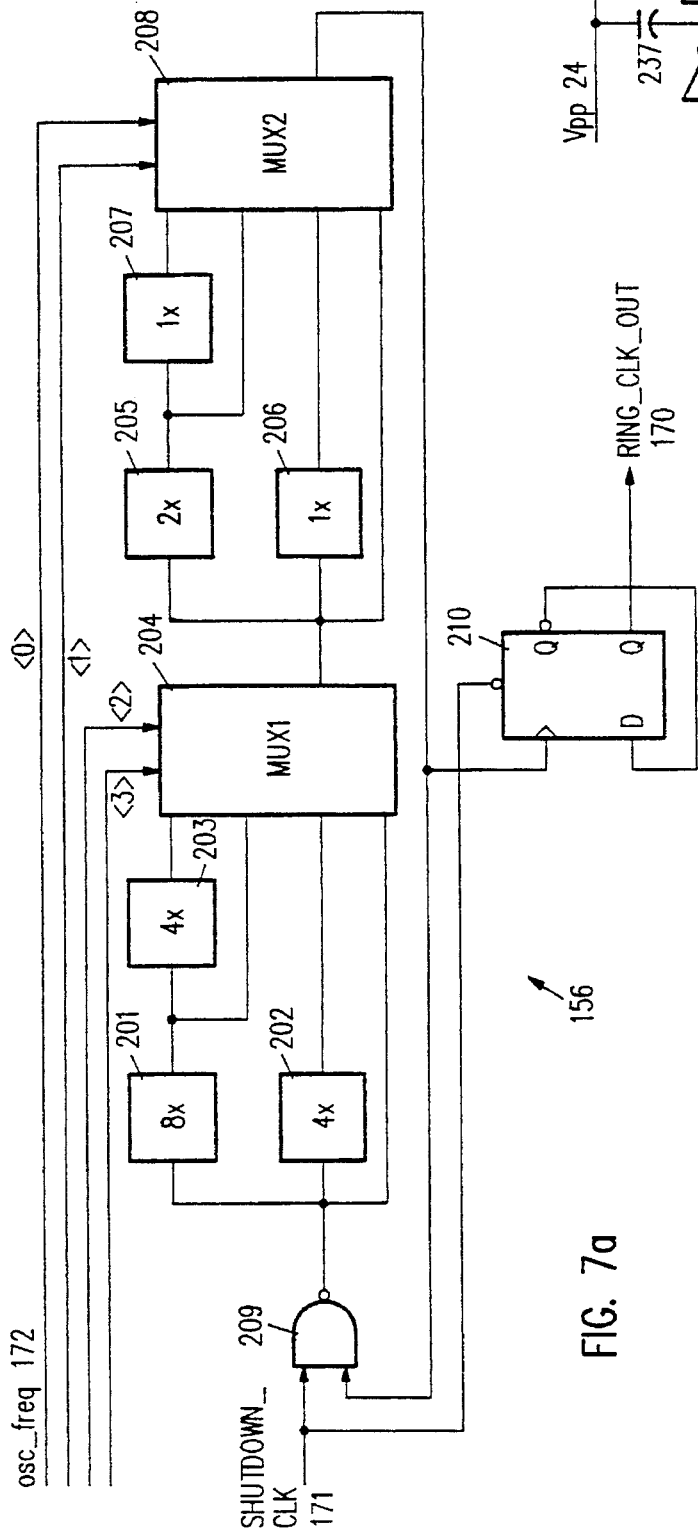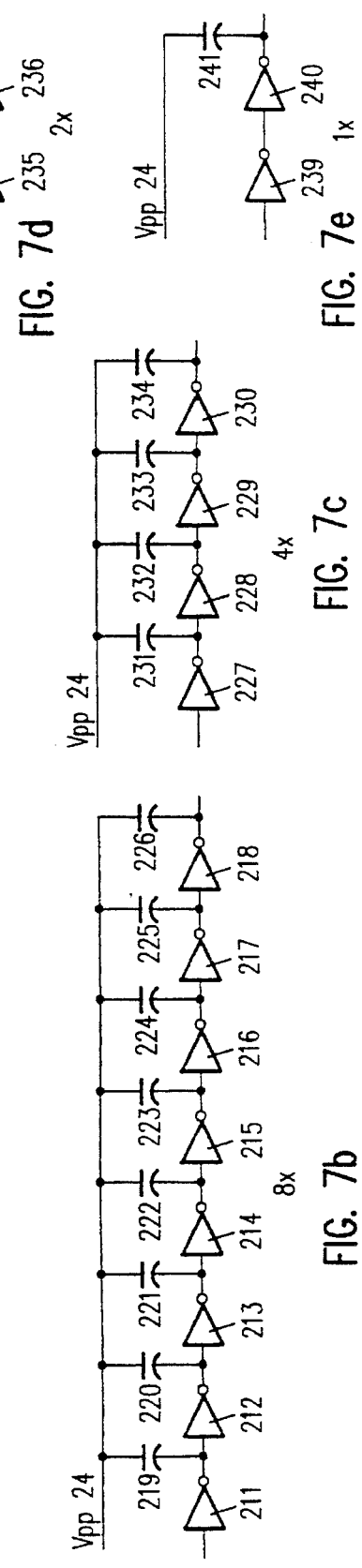
FIG. 7a
FIG. 7b
FIG. 7c
FIG. 7d
FIG. 7e

PROGRAMMABLE DISTRIBUTED PERSONAL SECURITY

BACKGROUND

This invention relates generally to integrated circuits for electronic data processing systems and more specifically to the architecture, implementation and use of a secure integrated circuit which is capable of effectively preventing inspection, extraction and/or modification of confidential information stored therein.

There are many applications in which information has to be processed and transmitted securely. For example, automated teller machines (ATMs) require the secure storage and transmission of an identifying key (in this context a password or PIN number) to prevent unauthorized intruders from accessing a bank customer's account. Similarly, pay-per-view (PPV) cable and satellite television systems must protect keys which both distinguish authorized from unauthorized subscribers and decrypt encrypted broadcast television signals.

Typically, one or more integrated circuits are used to process the information electronically. These integrated circuits may themselves store internal confidential information, such as keys and/or proprietary algorithms for encrypting and decrypting that information, as well as implement the encryption/decryption "engine." Clearly, there is a need for integrated circuits which are capable of preventing an unauthorized person from inspecting, extracting, and/or modifying the confidential information processed by such integrated circuits. Further, it is sometimes desirable to destroy certain confidential information (e.g., the keys) and preserve other confidential information (e.g., historical data, such as accounting information used in financial transactions) upon detection of intrusion.

One problem with existing security systems is that the confidential information (keys, encryption/decryption algorithms, etc.) is, at some point in the process, available to potential intruders in an unencrypted ("cleartext") form in a non-secure environment. What is needed is a single secure integrated circuit in which the keys and encryption/decryption engine and algorithms can be embodied and protected from intruders. Such an integrated circuit would effectively ensure that the information being processed (i.e., inputs to the chip) is not made available off-chip to unauthorized persons except in encrypted form, and would "encapsulate" the encryption/decryption process on the chip such that the keys and algorithms are protected, particularly while in cleartext form, from a variety of potential attacks.

Existing secure integrated circuits typically contain barriers, detectors, and means for destroying the confidential information stored therein when intrusion is detected. An example of a barrier is the deposition of one or more conductive layers overlying memory cells inside an integrated circuit. These layers prevent the inspection of the memory cells by diagnostic tools such as a scanning electron microscope. An example of a detector and destroying means is a photo detector connected to a switching circuit which turns off power to memory cells inside a secure integrated circuit upon detection of light. When power is turned off, the contents of the memory cells, which may contain confidential information, will be lost. The theory behind such a security mechanism is that the photo detector will be exposed to light only when the enclosure of the integrated circuit is broken, intentionally or by accident. In either event, it is often prudent to destroy the confidential information stored inside the integrated circuit.

One problem with existing security systems is the "hard-wired" nature of the process of responding to potential intrusions. Such systems are inherently inflexible because it is very difficult to change the behavior of the security features once the integrated circuit has been fabricated. The only way to alter the behavior of these security features is to undertake the expensive and time-consuming task of designing and fabricating a new integrated circuit.

Another consequence of a hard-wired architecture is that it is difficult to produce custom security features for low volume applications. This is because it takes a considerable amount of time and money to design, test, and fabricate an integrated circuit. Consequently, it is difficult economically to justify building small quantities of secure integrated circuits, each customized for a special environment.

There are many situations in which it is desirable to use the same secure integrated circuit, yet have the ability to modify the security features in accordance with the requirements of the application and environment. For example, if the secure integrated circuit is used to process extremely sensitive information, it will be prudent to implement a conservative security "policy"—e.g., destroying all the confidential data (e.g., keys) inside the integrated circuit upon detection of even a small deviation from a predetermined state. On the other hand, if the information is not very sensitive, and it is not convenient to replace the secure integrated circuit, the security policy could be more lenient—e.g., action could be taken only when there is a large deviation from the predetermined state.

Thus, it is desirable to have a secure integrated circuit architecture in which a broad range of flexible security policies can be implemented.

SUMMARY OF THE INVENTION

The present invention is embodied in a Secured Processing Unit (SPU) chip, a microprocessor designed especially for secure data processing. By integrating the keys and the encryption/decryption engine and algorithms in the SPU, the entire security process is rendered portable and is easily distributed across physical boundaries. For example, the SPU could be incorporated into an ATM card (and in ATM machines throughout the world), thereby implementing a worldwide distribution mechanism for secure financial transactions.

Reflecting this Programmable Distributed Personal Security (PDPS) design philosophy, the SPU provides a powerful security solution that is flexible, affordable, portable and personal. This enabling technology makes a high level of data security widely available and practical for a variety of applications: network communications, electronic funds transfer, wireless data exchange, systems for access, authorization and identification, and consumption-based delivery systems for intellectual property, e.g. copyrighted or trade secret material. The programmability of the SPU's security policies permits these various applications to be implemented without SPU hardware design changes, and yet accommodates the operating environment by facilitating application-specific responses to the range of security attacks or hardware/software failures that the SPU is designed to detect.

The present invention is designed to provide protection from an army of attacks, both electrical and physical through a battery of integrated hardware and software security features. By facilitating the implementation of a flexible response strategy appropriate to the application, the SPU is rendered highly resilient to physical attacks on the silicon and electrical attacks on the pins. The result is a system that is extremely difficult to reverse engineer, and that implements a flexible policy for protecting confidential information that cannot be easily compromised.

The SPU is dedicated to "security processing"—protecting both secret information and the processing based on that information. It securely creates, stores and/or deploys secret keys or algorithms used in the encryption and decryption of information. For example, although keys can be loaded into the SPU at manufacture time, keys may also be created onboard the SPU, including secret keys or private/public key pairs, as master keys, for various applications, for particular sessions within such applications, etc., the secure environment of the SPU being ideal for such functionality. The chip can be programmed through firmware to perform other functions as well, such as digital signaturing, verification, information metering and the like. Critical information can be stored both on-board the CPU or in encrypted form off-chip, in either case making the SPU the only place where such information exists at any time in unencrypted form.

By incorporating the SPU into a "smart card", using a platform such as a PCMCIA card (a standard interface promulgated by the Personal Computer Memory Card Interface Association), the combined system could function as an access card, holding information decryption keys, transaction records, credit and account information, one's own private keys, and digital certificates. About the size of a standard credit card, such access cards could perform a variety of applications and house diverse peripheral components, yet be extremely rugged, portable and secure.

Access cards incorporating the present invention would provide a very high level of data security for fixed or portable commercial applications, even on unsecured networks. They would provide increased security for existing applications and networks, and allow developers able to add security features to new products, such as messaging, privacy-enhanced mail and passwording. Entertainment, software and database content providers stand to benefit greatly from the high degree of protection for their intellectual property that such a system affords.

Such access cards could detect alteration of confidential information sent across computer networks and ensure that such information is made available only to its intended recipients, with complete privacy along the way. This is accomplished by the following SPU-based features: positive identification and reliable authentication of the card user, message privacy through a robust encryption capability supporting the major cryptographic standards, secure key exchange, secure storage of private and secret keys, algorithms, certificates or, for example, transaction records or biometric data, verifiability of data and messages as to their alteration, and secure authorization capabilities, including digital signatures.

The access card could be seen as a form of electronic wallet, holding personal records, such as one's driver's license, passport, birth certificate, vehicle registration, medical records, social security cards, credit cards, biometric information such as finger- and voiceprints, or even digital cash.

A personal access card contemplated for everyday use should be resilient to the stresses and strains of such use, i.e. going through X-ray machines at airports, the exposure to heat if left in a jacket placed on a radiator, a mistyped personal identification number (PIN) by a flustered owner, etc. Thus, in such an application, the SPU could be programmed with high tolerances to such abuses. A photo detector triggered by X-rays might be cued a few moments later to see if the exposure had stopped. Detection of high temperature might need to be coupled to other symptoms of attack before defensive action was taken. A PIN number entry could be forgiving for the first two incorrect entries before temporary disabling subsequent functions as is the case with many ATMs.

For an application like a Tessera Crypto-Card, a secure cryptographic token for the new Defense Messaging System for sensitive government information, the system might be programmed to be less forgiving. Handling procedures for Tessera Card users may prevent the types of common, everyday abuses present in a personal access card. Thus, erasure of sensitive information might be an early priority.

Various encryption schemes have been proposed, such as where a user creates and authenticates a secure digital signature, which is very difficult to forge and thus equally difficult to repudiate. Because of a lack of portable, personal security, however, electronic communications based on these schemes have not gained widespread acceptance as a means of conducting many standard business transactions. The present invention provides the level of security which makes such electronic commerce practical. Such a system could limit, both for new and existing applications, the number of fraudulent or otherwise uncollectible transactions.

Another possible application is desktop purchasing, a delivery system for any type of information product that can be contained in electronic memory, such as movies, software or databases. Thus, multimedia-based advertisements, tutorials, demos, documentation and actual products can be shipped to an end user on a single encrypted CD-ROM or broadcast though suitable RF or cable channels. Virtually any content represented as digital information could be sold off-line, i.e. at the desktop, with end users possibly permitted to browse and try such products before buying.

The encryption capabilities of the SPU could be employed to decrypt the information, measure and record usage time, and subsequently upload the usage transactions to a centralized billing service bureau in encrypted form, all with a high degree of security and dependability. The SPU would decrypt only the appropriate information and transfer it to a suitable storage medium, such as a hard disk, for immediate use.

Information metering, software rental and various other applications could also be implemented with an SPU-based system, which could authenticate users and monitor and account for their use and/or purchase of content, while securing confidential information from unauthorized access through a flexible security policy appropriate to the specific application.

This pay-as-you-go option is an incentive to information providers to produce products, as it minimizes piracy by authenticating the user's initial access to the system, securing the registration process and controlling subsequent use, thereby giving end users immediate access to the product without repeated authorization.

Other aspects and advantages of the present invention will become apparent from the following description of the preferred embodiment, taken in conjunction with the accompanying drawings and tables, which disclose, by way of example, the principles of the invention.

BRIEF DESCRIPTION OF THE DRAWINGS

FIG. 7 is a schematic representation of the Ring Oscillator shown in FIG. 6.

DETAILED DESCRIPTION a. General Architecture.

A flexible architecture in accordance with the present invention permits extension and customization for specific applications without a compromise in security. One physical embodiment of this invention is a single-chip SPU that includes a 20-MHz 32-Bit CPU, based on the National Semiconductor NS32FV16 Advanced Imaging and Communications microprocessor, but lacking that chip's Digital Signal Processing (DSP) unit.

Figure 1:
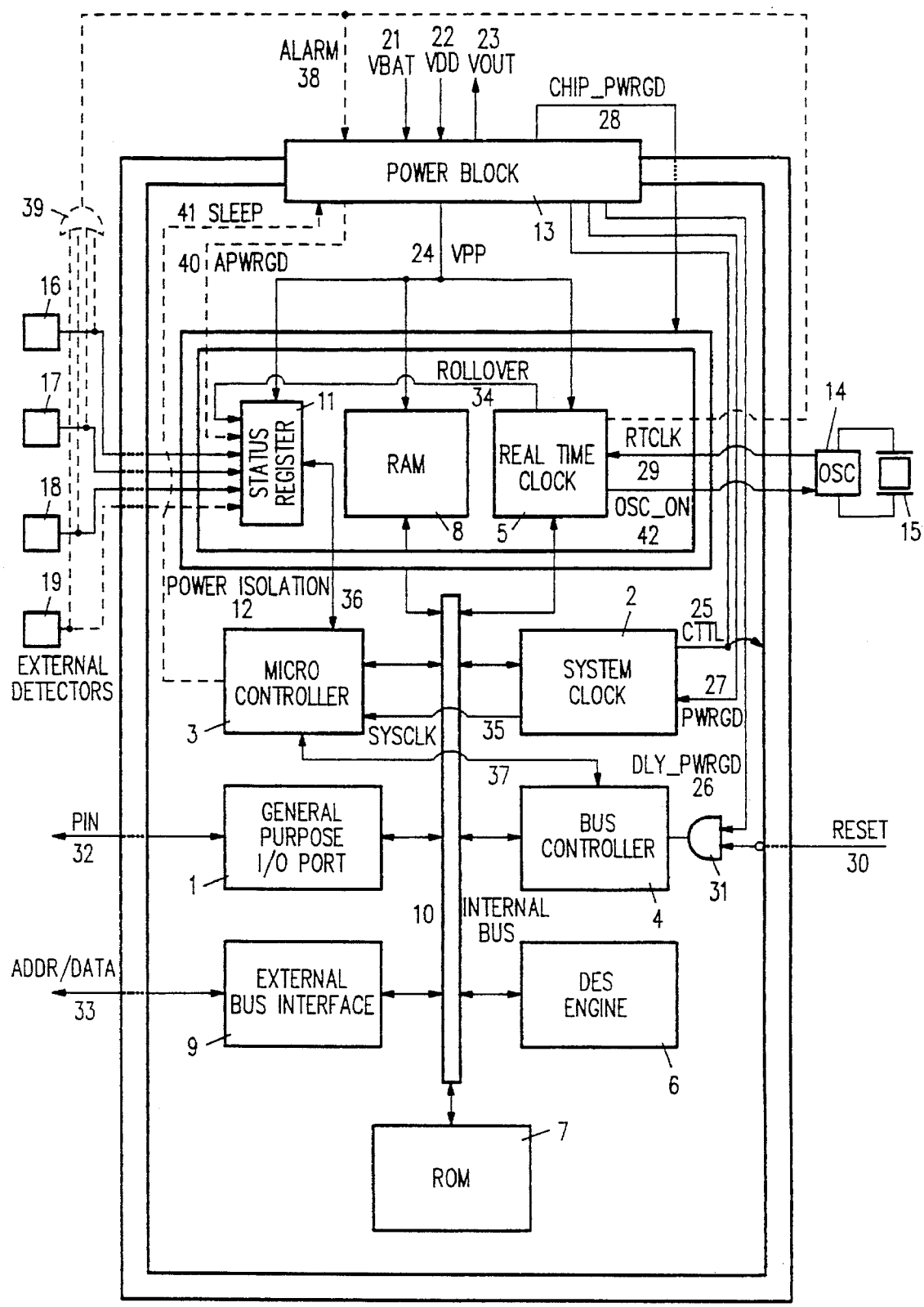
FIG. 1 is a simplified block diagram of the apparatus in accordance with the present invention, showing the Secured Processing Unit (SPU) for performing PDPS.

Referring to FIG. 1, the gross features of the SPU architecture are described. This description is not meant to be a literal description of the SPU layout, as some features have been moved or regrouped in order to gain a better conceptual understanding of the principles underlying the present invention. The SPU's Micro Controller 3 is isolated from all off-chip input—such input regulated by the External Bus Interface Block 9 and the general purpose I/O Port Block 1—instead receiving programmed commands via an Internal Data Bus 10 from the on-board ROM Block 7. In one embodiment, the ROM Block 7 is configured at 32 KBytes, and the battery-backed RAM Block 8 is configured at 4 KBytes. The Internal System Bus 10 carries all the major signals among the SPU peripherals, such as the address and data lines, read and write strobes, enable and reset signals, and the Micro Controller clock signal, CTTL 25.

The System Clock Block has a programmable internal high-frequency oscillator, and is the source, through SYSCLK 35, for the Micro Controller clock signal CTTL 25, which governs all peripheral functions.

The Real Time Clock 5 for the SPU follows the IEEE 1212 standard, which specifies control and status register architecture, and which builds upon and significantly enhances the UNIX time format (UNIX time being the number of seconds elapsed since Jan. 1, 1970). The Real Time Clock 5 is implemented through a binary ripple counter which is driven via RTCLK 29 by an off-chip external 32.768 KHz quartz crystal 14 in conjunction with RTC Oscillator 14 circuitry. Through an offset in battery-backed RAM 8, for example, the Real Time Clock 5 provides UNIX time, and can implement a host of time-based functions and time limits under ROM Block 7 program control. One firmware routine stored in the ROM Block 9 cross-checks the System Clock 2 and Real Time Clock 5 so as to overcome tampering with the latter.

The I/O Port Block 1 is a general-purpose programmable input/output interface which can be used to access off-chip RAM, and meet general I/O requirements. Off-chip RAM (not shown) would be typically used for information that cannot be accommodated internally but, for security and performance reasons, still needs to be closer to the SPU than main system memory or disk storage. This information may be protected by modification detection codes, and may or may not be encrypted, depending on application requirements. In addition to serving as a memory interface, several signals on this port can be used to implement cryptographic alarms of trip wire inputs, or even to zero inputs or keys.

The External Bus Interface Block 9 is the communications port to the host system. In one embodiment, it is the means for getting the application commands as well as data to and from the SPU, and is designed to match the ISA bus standard requirements.

The Power Block 13 switches between system and battery power depending on system power availability. Power from an external battery (not shown) is supplied to the RTC Block 5, the RAM Block 8 and a Status Register 11 through VPP 24, as well as off-chip RAM (not shown) through VOUT 23 when system power is not available. The Power Block 13 also provides signals PWRGD 27, DLY_PWRGD 26 and CHIP_PWRGD 28, which, respectively, start the System Clock 2, reset the Bus Controller 4 and enable the isolation of the battery-backed parts of the circuit from the non-battery backed parts through the Power Isolation 12.

A Silicon Firewall 20 protects the internal circuitry from any external asynchronous or otherwise anomalous signals, conditioning the inputs from the I/O Port Block 1 via PIN lines 32 or the External Bus Interface 9 via ADDR/DATA lines 33, the RF. SET 30 to the Bus Controller 4, as well as from a host of security detectors. Some internally generated signals, such as the output of the Real Time Clock 5, are similarly conditioned.

The Status Register 11 is the repository of all hardware detector signals arrayed through the device to detect various attempted security breaches. Detectors may include a Photo Detector 16, Temperature Detector 17, Metallization Layer Detector 18 and any Additional Detectors 19 (represented in ghost), for example: high/low voltage detectors, vibration detectors, sand detectors. Each of these detectors may convey one or more bits of information which, in one embodiment, are stored in the Status Register 11. The Status Register 11 may also store internally generated signals, such as the ROLLOVER 34 signal from the Real Time Clock 5 and the Valid RAM and Time (VRT) bit, used to verify the integrity of the information stored in the RAM Block 8 and the time counter in the Real Time Clock 5.

In one embodiment, a DES Engine 6 is provided as a cryptographic engine to encrypt and decrypt data using its DES algorithm. Alternative embodiments of cryptographic engines may be implemented entirely in hardware or in a combination of hardware and software, and may use other cryptological algorithms, including RSA or secret algorithms such as RC2, RC4, or Skipjack or combinations thereof. The DES Engine 6 receives keys and data for the cryptographic process from the RAM Block 8 under the control of the Micro Controller 3. The data used could be application data supplied from the External Bus Interface 9 or protected data from the RAM Block 8. The DES Block 6, in one embodiment, performs a decryption of a 64-bit block in 18 clock cycles. Thus, with an SPU rated at 20 MHz, a single decryption will take approximately 90 ns, which amounts to a decryption rate of 8.9 Mbytes per second.

Typically, the SPU receives "messages" in encrypted form. The cryptographic engine (e.g. DES Engine 6) uses keys, for example, "session keys" specific to a particular application transaction or "session". The cryptographic engine is thus used to encrypt or decrypt the messages, or perform other cryptographic operations as is well-known in the art. In addition to providing secure message transfer, the SPU also provides secure key transfer. By having, or indeed even generating a "master key" internally (using any of the well-known key generation techniques for public or secret key algorithms), the SPU can receive session keys in encrypted form and, treating them like messages, decrypt them with the cryptographic engine using the master key. Conversely, the SPU can encrypt and send messages in a secure manner. The master key, the decrypted session keys and other sensitive information (e.g. the encryption/decryption algorithms) are stored in secure rewritable memory on the SPU, as described below.

i. Power Block.

The security requirements of the SPU impose special requirements on the power supply. As the Real Time Clock 5 is used to maintain accurate time and the RAM 8 is used to store and maintain information, both for the field life of the product, each must have a continuous source of power, VPP 24, which here is supplied by the Power Block 13.

Figure 2:
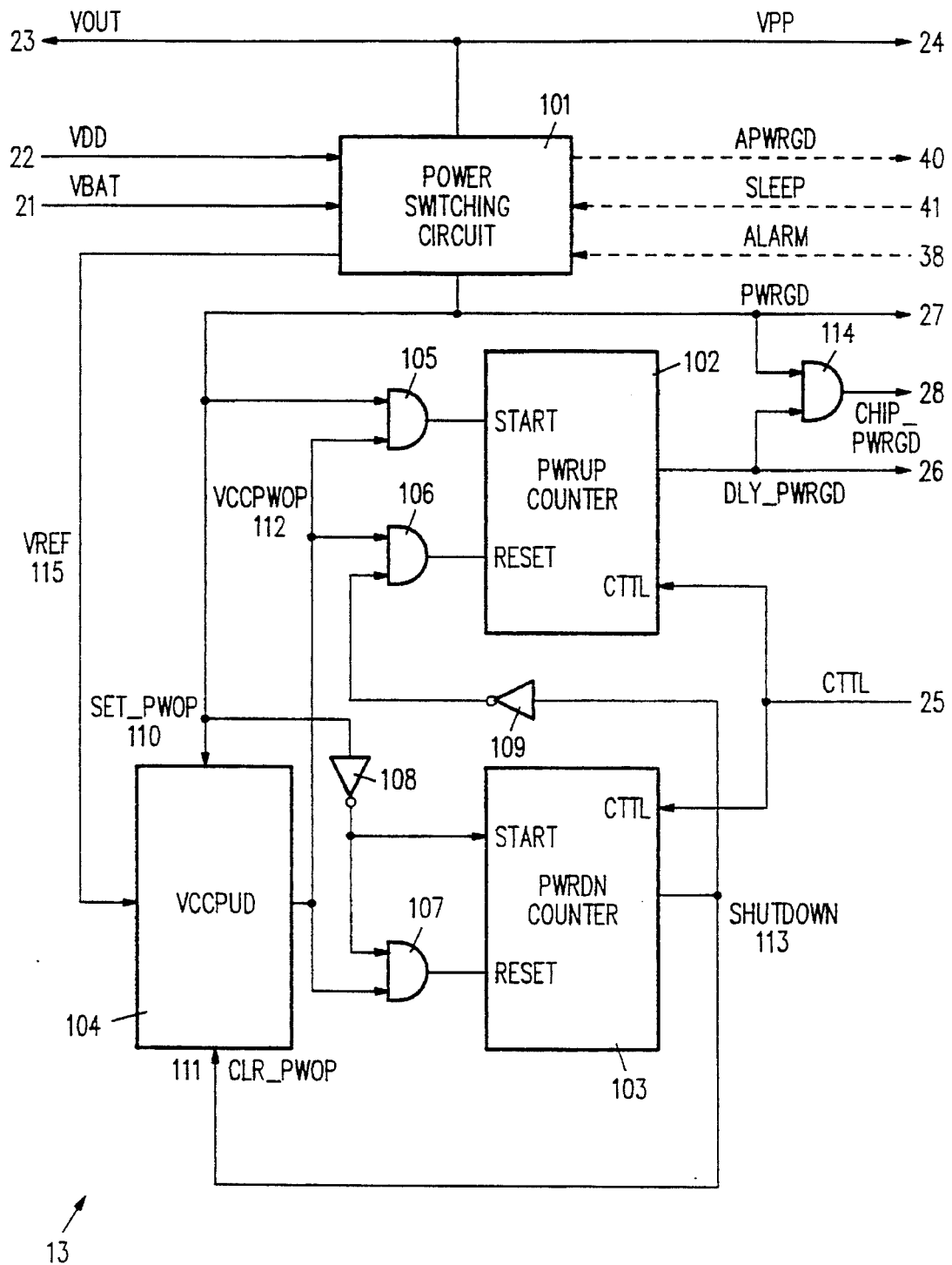
FIG. 2 is a simplified block diagram of the Power Block shown in FIG. 1.

Referring now to FIG. 2, the battery VBAT 21 and system VDD 22 voltages are supplied to the Power Switching Circuit 101. This circuit uses a conventional analog comparator to determine the higher of the two voltages, VDD 22 and VBAT 21, and provide such voltage as VPP 24 to the internal circuitry and as VOUT 23, which could be used as a voltage supply for off-chip RAM, for example. The Power Switching Circuit 101 also provides a PWRGD 27 signal, which is used to indicate whether the entire SPU chip is powered through VDD 22 (the high state), as opposed to only the battery-backed sections being powered via VBAT 21 (the low state). In one embodiment, the threshold for this switch is when VDD 22 exceeds 1.2 times VBAT 21. If the external battery is dead, VBAT 21 is effectively zero, and PWRGD 27 goes high as soon as VDD 22 is turned on.

The PWRGD 27 signal, as not originating from the Internal Data Bus 10, would represent a security risk within the circuitry inside the Silicon Firewall 20, if left untreated. However, unlike other signals that are passed through the Silicon Firewall 20, PWRGD 27 is used to start the System Clock 2, as discussed below, and thus cannot be conditioned and synchronized by the Silicon Firewall 20 in the manner those other signals are treated. Thus, the Power Switching Circuit 101 conditions the PWRGD 27 signal by a low-pass filter, which acts as a "glitch eater" to prevent any rapid changes in the resultant PWRGD 27 signal and give it a sufficiently narrow bandwidth as to admit to the internal circuitry.

Two counters, PWRUP Counter 102 and PWRDN Counter 103 are provided to produce DLY_PWRGD 26, a delayed version of PWRGD 27, as clocked by the system clock CTTL 34 signal. These counters may be conventional devices as is well known in the art. In one embodiment, this DLY_PWRGD 26 signal is used as an input to the AND gate 31 incident to the Bus Controller 4, as shown in FIG. 1, thus assuring the SPU is always powered up in the reset state. The DLY_PWRGD 26 and PWRGD 27 signals are combined through an AND gate 114 to produce another signal, CHIP_PWRGD 28.

The CHIP_PWRGD 28 signal is provided to prevent current flow from the battery-backed circuitry to the rest of the circuit that is not powered when the system power VDD 22 is removed, and thus allow for the orderly shutdown of the non-battery-backed sections. This signal acts as an early detection system for the system power going away. Referring to FIG. 1, the CHIP_PWRGD 28 signal is used by the Power Isolation Circuit 12 which isolates the inputs and outputs of the Real Time Clock 5, RAM 8 and Status Register 11 from non-battery-backed sections of the chip. CHIP_PWRGD 28 is conditioned in the manner of the Silicon Firewall 20 described below; this process has the added advantage of preventing any invalid writes to the RAM 8 or Real Time Clock 5 when the power source is being switched.

As described above, the DLY_PWRGD 26 signal may be used as a reset. However, if the PWRUP Counter 102 is powered up in the wrong state, it may affect the reset operation of the rest of the device. The state machine in PWRUP Counter 102 could power-up in a state of continual reset owing to the dual requirements of powering up without reset, and delaying the stopping of CTTL 34 clocking upon power down. To overcome this problem, a separate analog circuit $V_{cc}PUD$ 104 is provided, with inputs SET_PWUP 110 and CLR_PWUP 111, which respectively, set and clear the output VCCPWUP 107. The $V_{cc}PUD$ 104 circuit also monitors VDD 22 such that VCCPWUP 107 will also clear if VDD 22 falls below approximately 2 V. In this embodiment, VDD 22 is supplied by the Power Switching Circuit 101 via VREF 115.

The operation of the PWRUP Counter 102 and PWRDN Counter 103 in conjunction with $V_{cc}PUD$ 104 is thus as follows. On power up, until the system power VDD 22 comes up above 1.2 times VBAT 21, VCCPWUP 112 acts as a reset to PWRUP Counter 102 and PWRDN Counter 103; afterwards PWRGD 27 and consequently VCCPWUP 112 will come up, triggering the start of the PWRUP Counter 102. Seven clock cycles later, as clocked by CTTL 34, the DLY_PWRGD 26 and CHIP_PWRGD 28 signals will go high. Conversely, when VDD 22 comes down, before it dips below 2 V, it will drop below 1.2 times VBAT 21, thus PWRGD 27 will go low, starting the PWRDN Counter 103 via inverter 108. Eight clock cycles later, the PWRDN Counter 103 will trigger the SHUTDOWN 113 signal, which will activate CLR_PWUP 111, causing VCCPWUP 112 to go low, resetting the PWRDN Counter 103 via AND gate 107 and the PWRUP Counter 102 via inverter 109. Thus, if the PWRGD 27 signal is lower for longer than seven clock cycles the entire device is reset as if power has been completely removed. This delay takes into account transients in the power supply where VDD 22 goes high but dips below 2 V briefly before returning to an acceptable level.

ii. Alarm Wake Up.

One embodiment of the present invention disables detection capability when the SPU is running on battery power VBAT 21 only. In an alternative embodiment, in the absence of system power, VDD 22, non-battery backed parts of the SPU are temporarily powered through VBAT 21. As represented in ghost in FIG. 1, if any detector triggers a signal, the OR gate 39 would send an ALARM 38 signal to the Power Block 13.

With further reference to FIG. 2, if VBAT 21 alone was sufficiently high to power the whole SPU, a suitably modified Power Switching Circuit 101, would upon triggering by the ALARM 38 signal: (i) generate a PWRGD 27 signal much as seen before; (ii) generate a new signal, APWRGD 40, to indicate that the SPU was operating under alarm-triggered "emergency" power; and (iii) switch VREF 115 from VDD 22 to VBAT 21 so as not to interfere with the powering up process. In the continued absence of adequate VDD 22, a SLEEP 41 signal received by the Power Switching Circuit 101 would make PWRGD 27 and APWRGD 40 go low, switch VREF 115 back to VDD 22, and so trigger a power down much as seen before.

iii. Silicon Firewall.

A common assumption, when defining a security model, is that everything inside a system is protected while everything outside is not protected. In any effort to plan for security features, it is crucial to establish a clear understanding of the system boundary and to define the threats, originating outside the boundary, against which the system must defend itself. In the case of the SPU, the system boundary is the silicon boundary, or equivalently, the pins of the SPU package. The components inside the system boundary are of two types: those responsible for maintaining the security of the system; and, those responsible for performing other functions. Separating the two types of components is the boundary called the security perimeter, with the area between the security perimeter and the silicon boundary called the silicon firewall. The silicon firewall's role is thus to defend the security perimeter. One aspect of this role, for example, is to prevent asynchronous inputs from outside the security perimeter reaching inside untreated; such inputs may drive the system into unpredictable and uncontrollable states.

The Micro Controller 3 is one of the least trusted components in the SPU, precisely because it is difficult to verify all the multitudinous states of a micro controller. Consequently, the Micro Controller 3 in a SPU should be protected from asynchronous or otherwise abnormal inputs, i.e., signals which are outside the normal operating mode of the Micro Controller 3. Examples of abnormal inputs are signals which have disallowed input levels (e.g., signals which have neither valid high nor valid low logic levels) and signals which have timing transitions which are out-of-specification. Not only do input signals external to the SPU need treatment, but all internal signals which are asynchronous to the Micro Controller must be treated by special protection circuitry.

Figure 3:
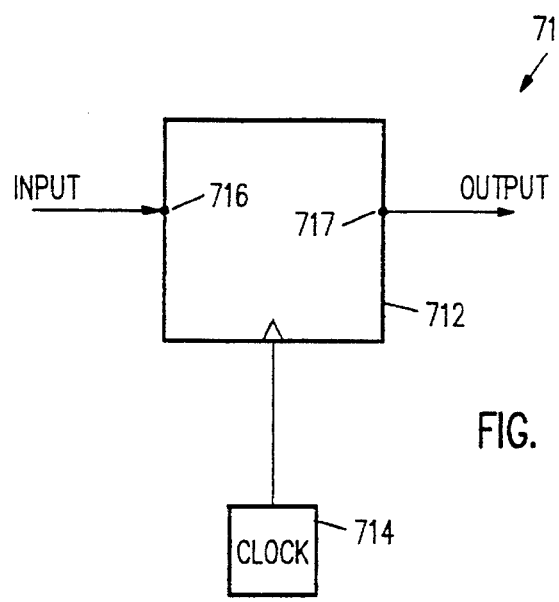
FIG. 3 is a schematic representation of the Silicon Firewall.

A common technique to prevent asynchronous and abnormal inputs is to equip all inputs to a semiconductor chip with Schmitt trigger devices coupled with latch circuits, which thereby ensure that signals cannot change state while they are being sampled by the semiconductor chip. However, it is difficult to fabricate Schmitt triggers. Furthermore, Schmitt triggers are slow because of hysteresis effects. The SPU according to the present invention uses a "Silicon Firewall" design to protect all interfaces to the Micro Controller 3. One of the designs of the Silicon Firewall involves a state machine. FIG. 3 shows one embodiment of a state machine 710 which could be used as a Silicon Firewall. State machine 710 comprises a data register 712, the state of which is controlled by a clock 714. In this embodiment, state machine 710 operates as a four t-state machine. During any time other than t1, data is locked out of data registers 712. In t1, input data (if available) is latched into an input port 716 of data register 712. However, data is not available to the output port 717 of data register 712 until t3. Consequently, any metastable states of the input data are nullified by the two t-cycle delay.

Figure 4:
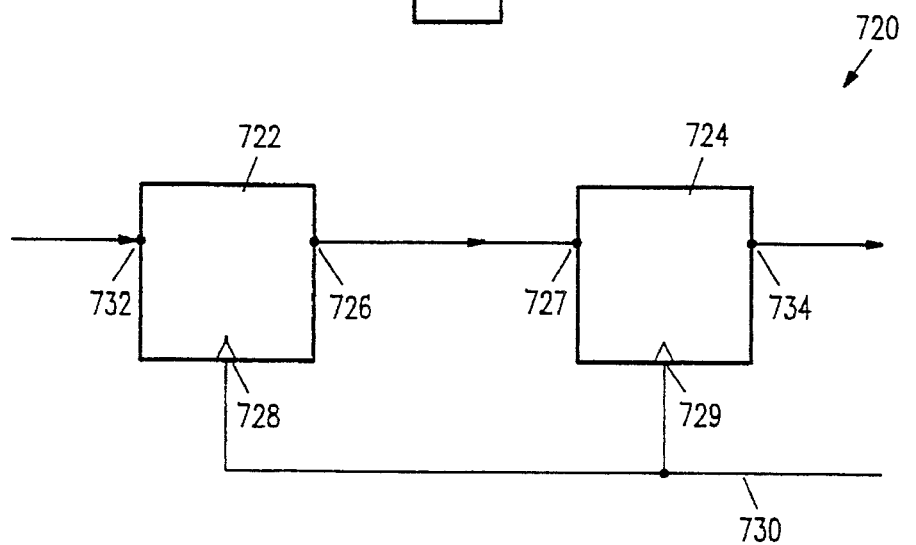
FIG. 4 is a schematic representation of an embodiment of the Silicon Firewall shown in FIG. 3.

FIG. 4 shows an embodiment of a data register 720 which can be advantageously used in state machine 710. Register 720 comprises two D flip-flops 722 and 724. The output terminal 726 of flip-flop 722 is coupled to the input terminal 727 of flip-flop 724. A clock signal is sent to the clock terminals 728 and 729 of flip-flops 722 and 724, respectively, along line 730.

When an external signal, which is generally asynchronous, is applied to the input terminal 732 of flip-flop 722, its state (high or low) is latched into flip-flop 722 only at the rising edge of the first clock pulse. This state is kept the same until the rising edge of the second clock pulse. As a result, the output signal at terminal 726 of flip-flop 722 remains at the same state from the rising edge of the first clock pulse to the rising edge of the second clock pulse, regardless of the state of the input signal between the two rising edges.

The state of the output terminal 726 of flip-flop 722, which corresponds to the external signal at the rising edge of the first clock pulse, is latched into flip-flop 724 at the rising edge of the second clock pulse. Consequently, the output terminal 734 of flip flop 724 will have a state equal to the state of the external signal at the rising edge of an earlier clock pulse.

It can be seen from data register 720 that the input is sampled at a time determined (i.e., synchronized) by the clock pulses. In addition, any abnormal signal is filtered by flip-flop 722. Consequently, the signal connected to the embedded controller is a normal and synchronized signal.

Figure 5:
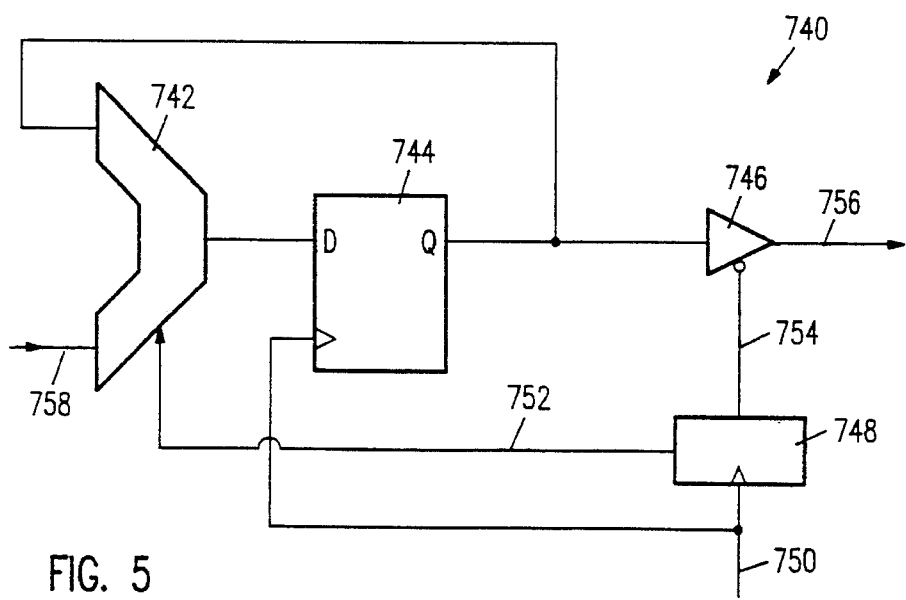
FIG. 5 is a schematic representation of an alternative embodiment of the Silicon Firewall shown in FIG. 3.

FIG. 5 shows an alternative embodiment of a data register 740 which can be advantageously used in state machine 710. Data register 740 consists of a multiplexer 742, a D flip flop 744, a buffer 746, and a device 748 for generating a clock signal having four t-states in response to an input clock signal on line 750. The output of multiplexer 742 is connected to the input of D flip flop 744, and the output of D flip flop 744 is connected to the input of buffer 746 and one of the input terminals of multiplexer 742. The other terminal of multiplexer 742 is connect to an external signal (typically asynchronous). Device 748 generates a clock signal on line 752 which controls multiplexer 742 such that the external asynchronous signal on line 758 is coupled to D flip flop 744 only at time t1. Device 748 also generates a clock signal on line 754 which controls buffer 754 such that the output signal of D flip flop 744 passes through buffer 746 only at time t3. As a result, the signal on line 756 is synchronized.

iv. Internal System Clock.

A system clock compatible with PDPS faces a series of design considerations: cost, governmental regulatory compliance, printed circuit board area, power consumption and last, but most important, security. The desire for high performance places a premium on clock speed, which is directly proportional thereto.

The cost of clocking circuits increases with frequency, and external clocks may represent a sizeable fraction of the entire manufacturing cost. The greater the physical extent of the high-frequency circuitry, the greater the high-frequency EM emissions, resulting in both a problem for security as well as meeting FIPS 140-1 requirements. EM emissions can give surprising amounts of information to sophisticated attackers—by analyzing the power spectrum, one might even deduce which type of algorithm is being processed at any particular time. As compared with an internal clock sitting right on the microprocessor, an external clock coupled to a microprocessor cannot be made to comply as easily with the FIPS 140-1 EMI/EMC requirements which impose limits on EM emissions. External clocking arrangements can use significant real estate on printed circuit boards and hence restrict design applications. The desire to reduce power consumption favors internal clocks: they can operate at lower voltages than external ones, which have to deal with high outside EM interference; and, they have smaller power dissipation capacitances owing to their smaller physical dimensions. Moreover, the presence of an external clock allows a potential chip attacker to manipulate the clock speed, a factor which may allow it to foil other security devices.

Internal oscillators, of themselves, are not novel structures. One can find a programmable internal oscillator in Carver Mead and Lynn Conway, *Introduction to VLSI Systems,* Addison & Wesley (1980), pp. 233–236. Another example is a phase-locked loop circuit which locks upon an external low frequency reference, as described by Brian Case, "Sony & HDL Detail Embedded MIPS Cores", Microprocessor Report, vol. 7, no. 15, Nov. 15, 1993. This outside link through an external reference is completely inappropriate in a security environment, however.

Figure 6:
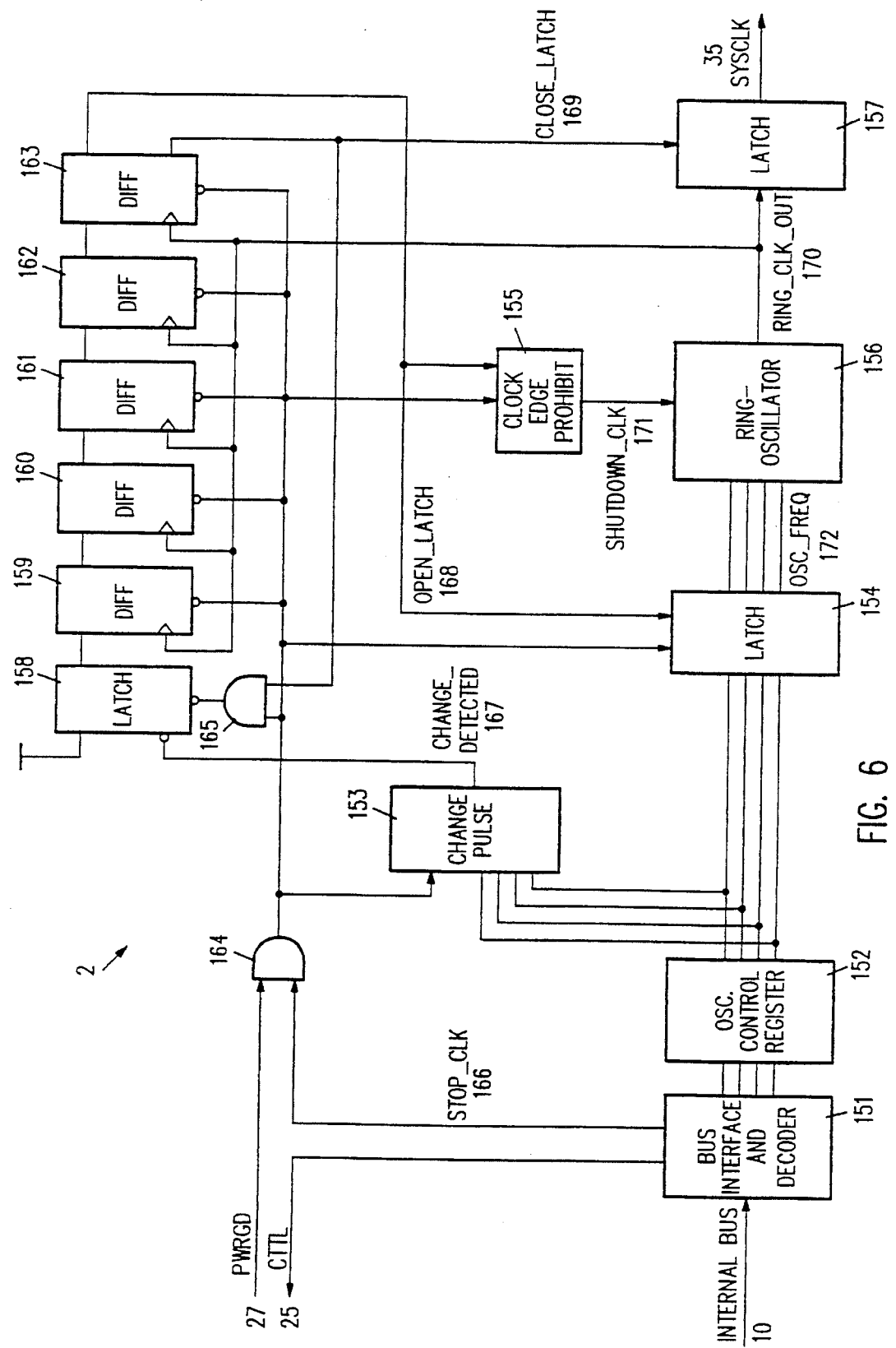
FIG. 6 is a block diagram of the System Clock shown in FIG. 1.

Referring now to FIG. 6, the System Clock 2 is implemented using a standard 5-clock-cycle shutdown, 5-clock-cycle enable, state machine once a change request has been detected. The Bus Interface and Decoder 151 selects and decodes three types of signals off the Internal Bus 10: the internal system clock signal CTTL 34 which is passed onto Power Block 13 as was illustrated in FIG. 1; a STOP_CLK 166 signal to stop the System Clock 2; and the 4 bit signal OSC_FREQ 172, representing the programmed frequency for the Ring Oscillator 156 The OSC_FREQ 172 signal is stored in the Oscillator Control Register 152, and is fed into the Change Pulse Generator 153. The STOP_CLK 166 and PWRGD 27 signals are fed into AND gate 164, the output of which is fed into the Change Pulse Generator 153, AND gate 165, the set of entry latches 154, the Clock Edge Prohibit 155, and the resets for the D flip-flops 159, . . . , 163. Thus, when the Change Pulse Generator 153 detects a change in any of its inputs, it generates a pulse CHANGE_DETECTED 167 which is latched onto the latch 158. The D flip-flops 159, . . . , 163 act as a shift register, propagating the latched signal from latch 158 down the line in five clock cycles, the clocking generated by RING_CLK_OUT 170, the output of the Ring Oscillator 156. When the signal has propagated through the last D flip-flop 163, it generates: (i) an OPEN LATCH 168 signal to the entry latches 154 and Clock Edge Prohibit 155; and (ii) a CLOSE_LATCH 169 signal to the exit latch 157 and the AND gate 165, thus resetting the latch 158.

The OPEN_LATCH 168 signal, in conjunction with a high signal from the AND gate 164 will enable the Clock Edge Prohibit 155, which is a one-shot trigger generating a SHUTDOWN_CLK 171 signal for approximately 120 ns, allowing a new frequency to be programmed into the Ring Oscillator 156 without introducing transient glitches. At the same time, the CLOSE_LATCH 169 signal will remain low for one clock cycle, resulting in the output SYSCLK 35 having a longer duty cycle for one clock cycle, and then the data in the Oscillator Control Register 225 will correspond to the output frequency of SYSCLK 35.

The Ring Oscillator 156 itself will now be described. To compensate for the wide process variations introduced in manufacture, resulting in variances in individual clock rates over a wide range, the Ring Oscillator 156 is programmable to sixteen different frequencies of operation: 22 MHz, 23 MHz, 24.8 MHz, 26.2 MHz, 27.7 MHz, 29 MHz, 31.9 MHz, 34.3 MHz, 37.8 MHz, 40.2 MHz, 46 MHz, 51.2 MHz, 58.8 MHz, 64.9 MHz, 82.2 MHz and 102.2 MHz. The particular nature of the Micro Controller 3, as well as concerns for the operational compatibility with the ROM 7, dictated that these nominal frequencies be divided by two before the signal leaves the Ring Oscillator 156 and is provided to the Micro Controller 3 via SYSCLK 35.

Referring now to FIG. 7(a), one can see that this aforementioned frequency division is accomplished by the D flip-flop 210 whose output is RING_CLK_OUT 170. The OSC_FREQ 172 signals are supplied in pairs to one of two multiplexers MUX1 204 and MUX2 208. The output of MUX2 208 is fed to the D flip-flop 210 clock input and the NAND gate 209. The SHUTDOWN_CLK 171 signal is fed to the D flip-flop 210 reset and the NAND gate 209. Blocks 201, 202, 203, 205, 206, 207 are chains of inverters, represented in FIGS. 4(b), 4(c), 4(c), 4(d), 4(e) and 4(e), respectively. Depending on the state of the OSC_FREQ 171 signals, from (0,0,0,0) to (1,1,1,1), asserted on the multiplexers MUX1 204 and MUX2 208, the results yield an effective circuit varying in the number of inverters. In FIG. 7(b) a chain of 8 inverters 211, . . . , 218 is shown, each connected to VPP 24 through capacitors 219, . . . , 226. These capacitors act to swamp all routing capacitance through the circuit. Similarly, FIG. 7(c) shows the corresponding 4 inverter chain, with inverters 227, . . . , and capacitors 231, . . . , 234. FIG. 7(d) shows the 2 inverter chain with inverters 235 and 236, capacitors 237 and 238. Finally, FIG. 7(e) also shows two inverters 239 and 240, but with only a single capacitor 241 attached to the output of the second inverter 240. Two inverters are required in this last case, because an even number of inverters, in conjunction with the NAND gate 209, is required to give the ring a net overall inversion, sustaining the Ring Oscillator 156. It is the combined propagation delays through all the inverters, the NAND gate 209 and the multiplexers MUX1 204 and MUX2 208 which generates the 16 different frequencies of the Ring Oscillator 156 listed above.

At manufacturing time, the frequency selected is based on calibration with an established time standard. This standard may be provided by the Real Time Clock 5, or by "Start" and "Stop" time commands timed and sent from a trusted system. Using the Real Time Clock 5 provides the optimal calibration input. This calibration is accomplished at the same time secret keys are installed and can only be done in the manufacturing mode. The final set frequency, as read from the lowest four bits of the Oscillator Control Register 152, is stored in the battery-backed RAM 8 or some other non-volatile memory. Each time the device is reset, or power is applied, the device assures itself that the final set frequency stored in non-volatile memory is correct by using modification detection codes, as described below. If the final set frequency is correct then it is loaded into the lowest four bits of the Oscillator Control Register 225 thus re-establishing the optimal operating frequency of the Ring Oscillator 156. If the final set frequency is incorrect, as stored in the non-volatile memory, then no value is loaded into the Oscillator Control Register 225, thus leaving it at its reset value. Leaving the Ring Oscillator 156 at its reset value, which is the lowest programmable frequency, ensures proper operation of the device even under conditions of non-volatile memory. For example, it assures that the internal Micro Controller clock input SYSCLK 216 is never driven at too high a frequency, which could lead to malfunction and possible security breach.

v. Real-Time Clock.

For the reasons disclosed above, as well as an innate temperature variability of about 30% over the SPU's operating range, the System Clock 2 represents a secure but somewhat inaccurate timing device, suitable for internal clocking of the Micro Controller 3, but not for keeping UNIX time or to control timed and time-of-day events.

Referring to FIG. 1, the RTC Oscillator 14 is designed to produce a 32.768 KHz signal, RTCLK 29, through use of an external quartz crystal 15. Alternatively, one could bypass the RTC Oscillator 14 and generate RTCLK 29 through an external clock. OSC_ON 42 allows the oscillator to be stopped even though battery power is applied to the device. This prevents drain on the battery, as for example, while the system is in inventory before it is sold. The output RTCLK 236 from the RTC Oscillator 241 is used to drive the Real Time Clock, as described below.

Figure 8:
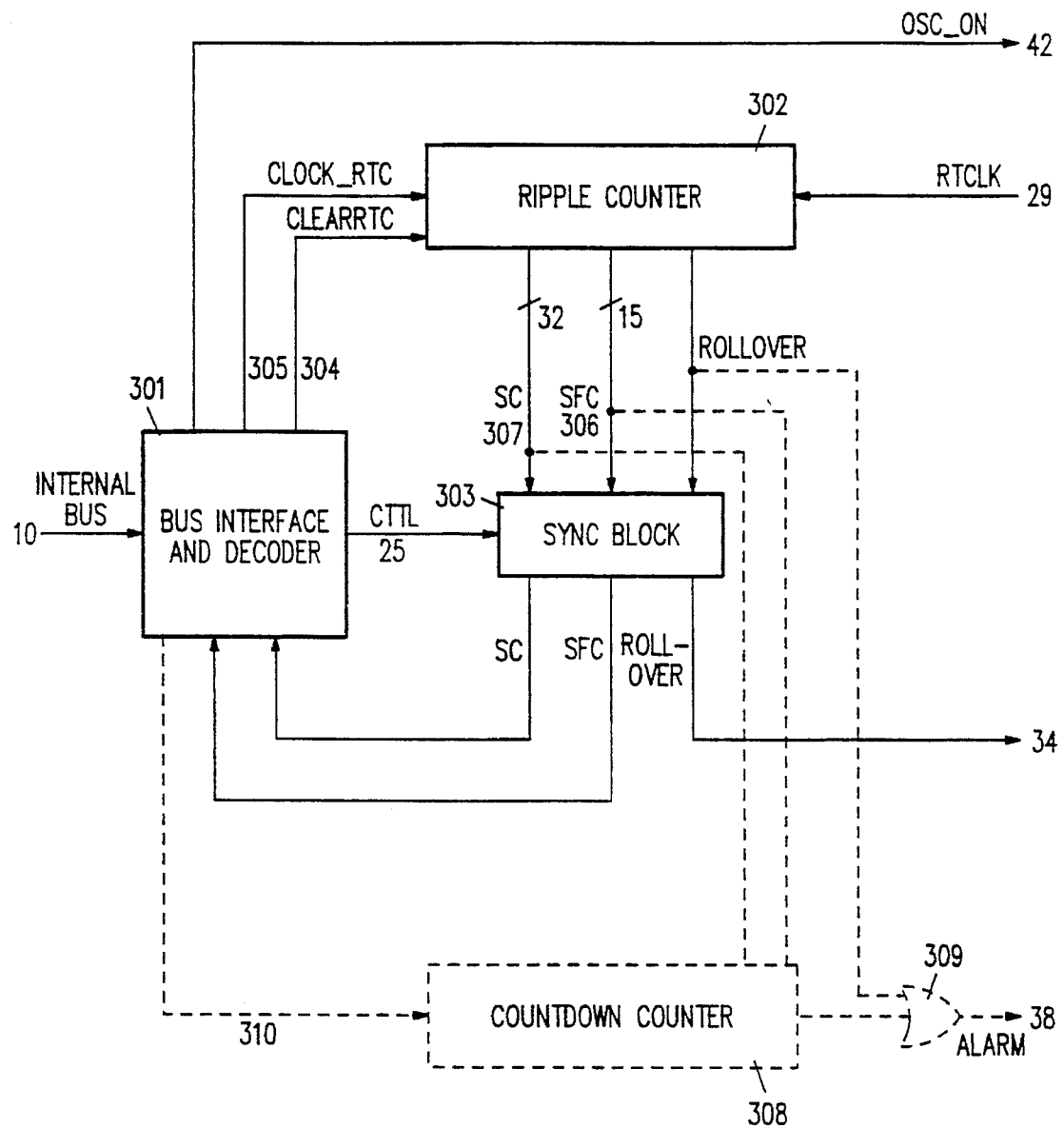
FIG. 8 is a block diagram of the Real Time Clock shown in FIG. 1.

With reference to FIG. 8, the Real Time Clock 5 consists of a binary Ripple Counter 302, a Bus Interface and Decoder 301, and a Synchronization Block 303. The Ripple Counter 302 may be a conventional shift register array with 15 bits allocated to counting fractions of seconds, output via SFC 306, and 32 bits allocated to a seconds counter, output via SC 307. The value of SC 307, when combined with an offset in the local battery-backed RAM Block 8, produces the sought-after UNIX time. The final carry-over in the Ripple Counter 302 produces the ROLLOVER 34 signal.

The Bus Interface and Decoder 301 interfaces with the Internal Bus 10 and supplies the system clock CTTL 25, the aforementioned OSC_ON 42 signal, and signals CLEAR_RTC 304 and CLOCK_RTC 305. CLEAR_RTC 304 is used to reset the Ripple Counter 302. CLOCK_RTC 305 allows the Micro Controller 3 to clock the Ripple Counter 302 without resorting to RTCLK 29, and thus permits testing of the device.

As RTCLK 29 is an external asynchronous signal, the resulting signals SFC 306, SC 307 and ROLLOVER 34 need to be treated by the Synchronization Block 303, in the manner of the Silicon Firewall described earlier. Thereafter, the SFC 306 and SC 307 signals may be appropriately channeled through the Internal Bus 10 in response to polling by the Micro Controller 3. The use of the ROLLOVER 34 signal will be discussed in the context of the Rollover Bit discussed below.

In accordance with the alarm wake-up feature of the alternative embodiment discussed above, a Countdown Counter 308 (represented in ghost) is set by the Micro Controller 3 via counter control signals sent on the Internal Bus 10, decoded by the Bus Interface and Decoder 301 and transmitted via line(s) 310. Thus, when the Countdown Counter 308 accomplishes a predetermined count, as clocked off the Ripple Counter 302 signals SC 307 or SFC 306, it would issue an ALARM 38 signal in the same manner as described above. In addition, the ROLLOVER 309 signal, passed through OR gate 309, may provide the basis of another wake up signal via ALARM 38.

vi. Inverting Key Storage.

It is desirable to place secret information (e.g., the decryption key) in the volatile, or generally, re-writable memory of the SPU. The secret information will be destroyed if power to the SPU is turned off. On the other hand, if the secret information is placed in non-volatile memory, an attacker can remove the SPU and at his leisure and by conventional means examine the information in the non-volatile memory.

If secret information is not loaded into the volatile memory properly, an attacker may still be able to examine the SPU while system power is turned off and obtain the secret information. This is because the secret information stored in conventional volatile memory may leave a residue on the dielectric material of the SPU, which the attacker can read to obtain the secret information even after power is turned off. When the secret information is loaded into memory, the voltage level of the memory cells causes charge to build up in the dielectric material of the memory cells. If the same secret information is placed in the same memory location for an extended period of time, the dielectric material may be permanently affected by the charge of the memory cells. When this happens, it is possible to determine the secret information even after power is removed from the memory cells. Further, it is possible to artificially "age" the memory cells (so that the dielectric material can be permanently affected in less time) by elevating the voltage and changing the operating temperature of the SPU.

One aspect of the present invention is an inverting key storage arrangement wherein the secret keys are periodically inverted. As a result, the net average charge across all memory cells is the same, thus leaving no signature of a specially-selected key in the dielectric material of the memory cells which would be amenable to detection.

Figure 9:
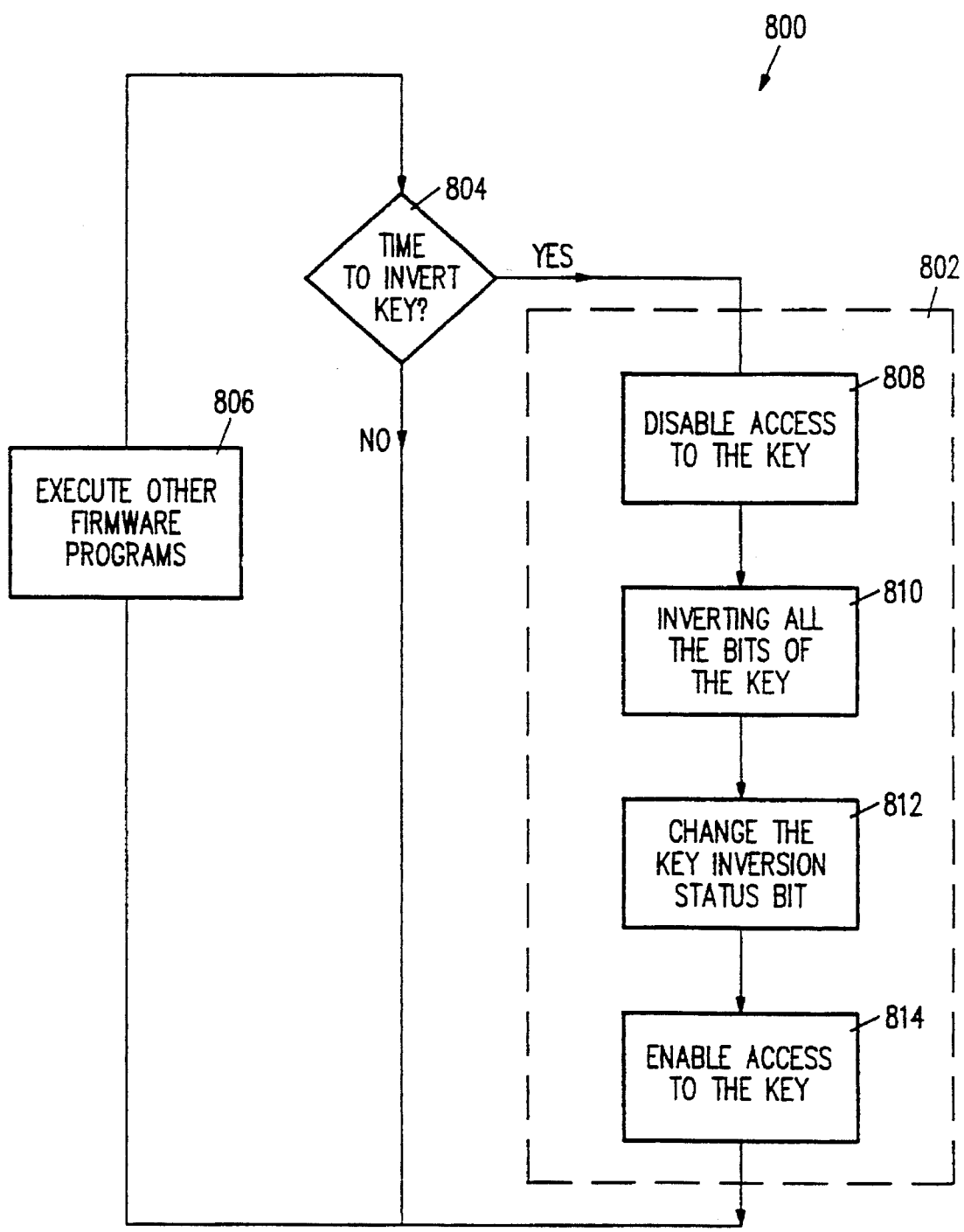
FIG. 9 is a flowchart of the firmware process for performing the Inverting Key Storage.

In one embodiment of the invention, the inverting key storage arrangement is implemented in firmware. The firmware includes a key inverting routine which is executed in a predetermined time, e.g., once every 100 ms. A flowchart 800 which includes a key inverting routine 802 is shown in FIG. 9. Flowchart 800 contains a decision block 804 which determines if it is time to branch to inverting routine 802. If the answer is negative, programs in the firmware are executed (block 806). If it is time to execute the key inverting routine 802, flowchart 800 branches to block 808 which causes all access to the keys to be disabled. The embedded controller then reads the key stored in volatile memory. The bits of the key are inverted and then stored back into memory (block 810). In order to keep track of the current status of the inversion (i.e., whether the key is in a normal or inverted state), a key-inversion status bit is assigned to keep track of the status. After the key is inverted, the status of the key-inversion status bit is changed (block 812). The access to the key is now enabled (block 814). Flowchart 800 can now branch to block 806 to execute other firmware routines.

Figure 10:
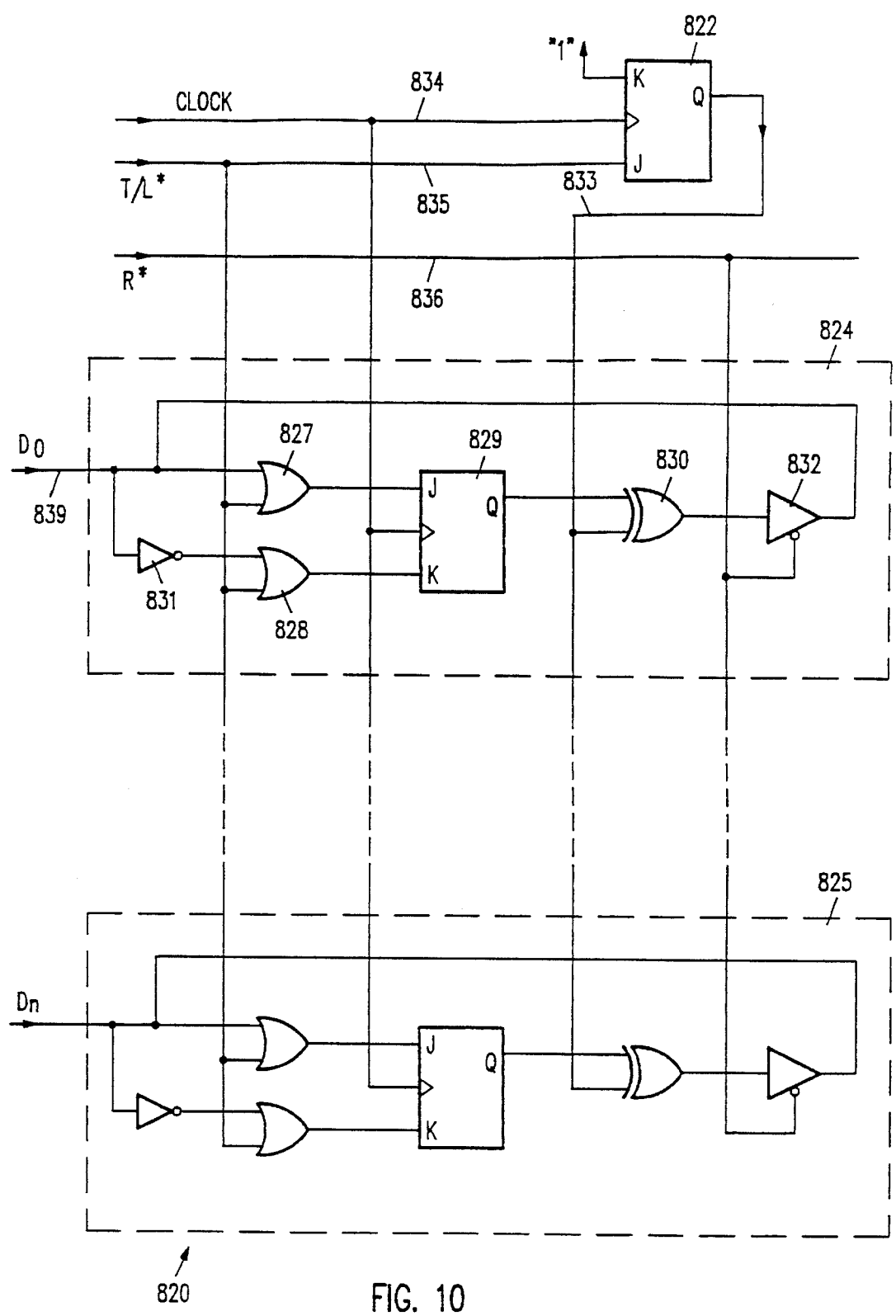
FIG. 10 is a schematic representation of the Inverting Key Storage.

It is also possible to implement an inverting key storage arrangement using only hardware. FIG. 10 is a schematic diagram of such an arrangement 820, which contains a JK flip flop 822 and a plurality of memory cells, such as cells 824 and 825. The structure of these two cells are identical, and only one will be described in detail. Cell 824 contains two OR gates 827 and 828, a JK flip flop 829, a NOR gate

830, an invertor 831, and a buffer 832. A clock signal on line 834 is connected to the clock input of the two flip flops 822 and 829. A Toggle/Load signal (T/L*) on line 835 is used to put the cells 824 and 825 in a toggle state when the signal is at a high value and the cells in a load state when the signal is at a low value. Thus, when the T/L* signal is low, the data on line 839 is loaded into memory cell 824. When the T/L* signal is high, the JK flip flop 829 will toggle according to the clock signal on line 834. A read signal on line 836 is coupled to the enable terminal of buffer 832. The read signal allows the data stored in the memory cells to be read. The signal on line 836 indicates whether the output on line 839 is the original or the inverted signal.

vii. Additional Security Features.

Figure 11:
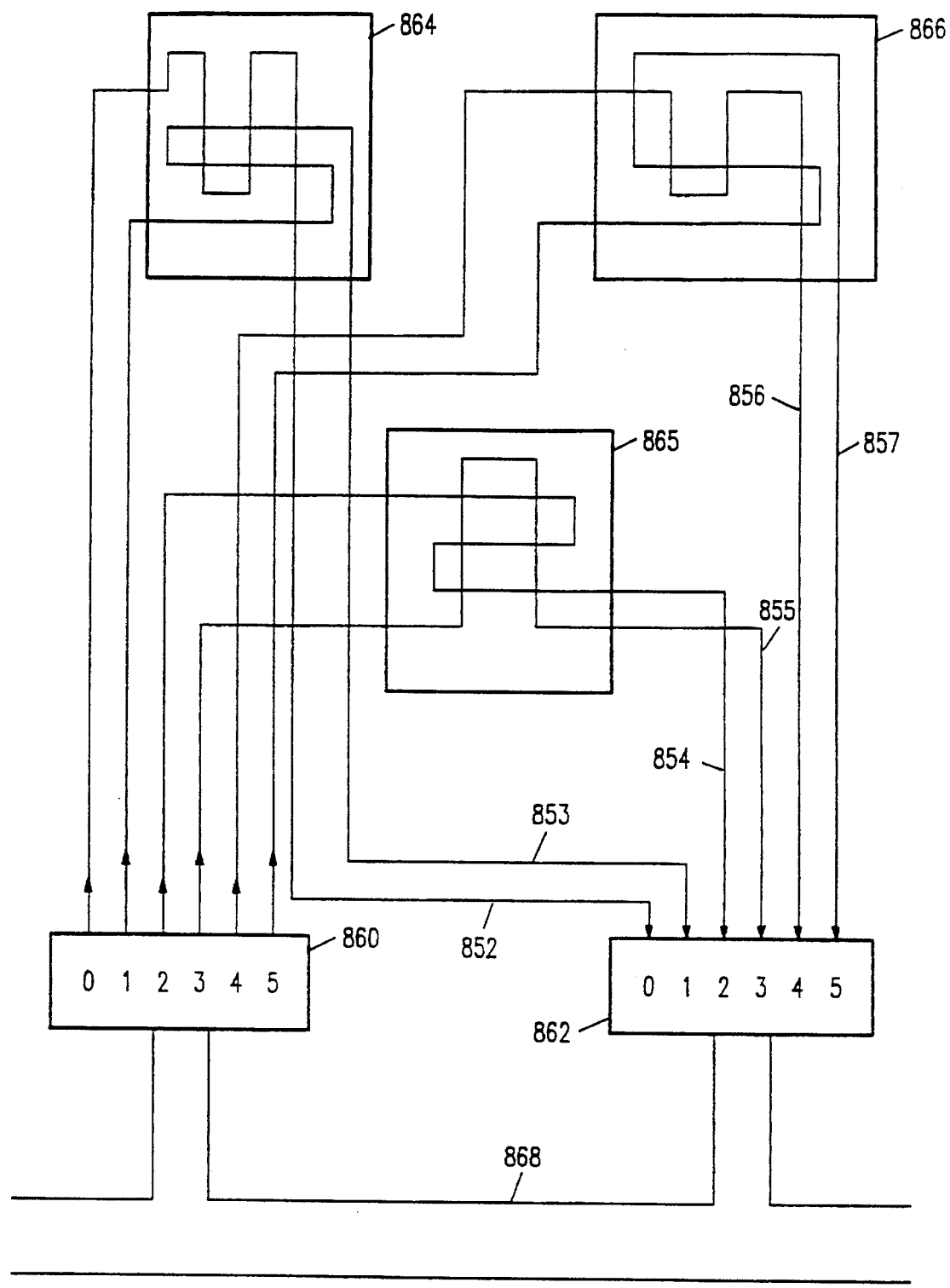
FIG. 11 is a block diagram of an embodiment of the Metallization Layer Detector shown in FIG. 1.
Figure 12:
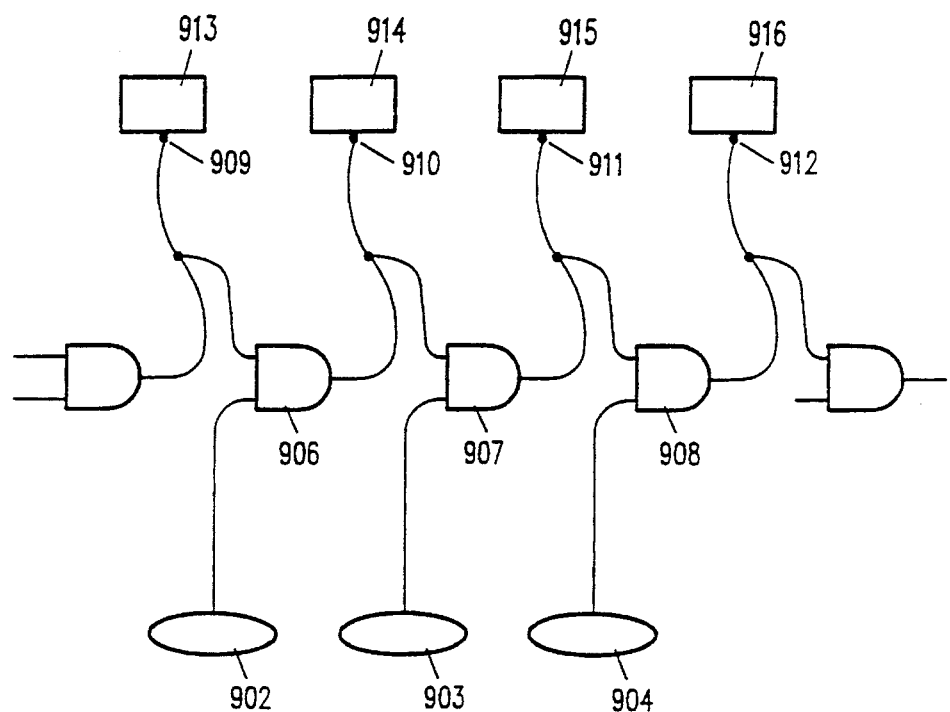
FIG. 12 is a schematic representation of an alternative embodiment of the Metallization Layer Detector shown in FIG. 1.
Figure 13:
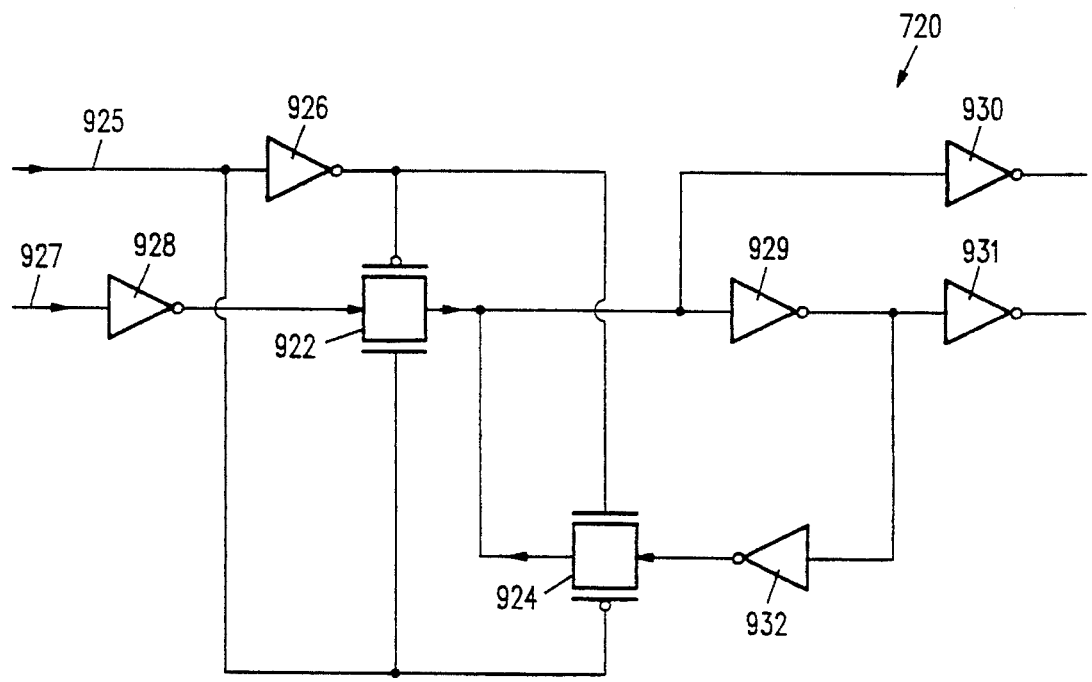
FIG. 13 is a schematic representation of a second alternative embodiment of the Metallization Layer Detector shown in FIG. 1.

In addition to the features described above, the SPU can certainly be rendered more secure in any number of ways. For example, the physical coating disclosed in application Ser. No. 08/096,537, "Tamper Resistant Integrated Circuit Structure", filed Jul. 22, 1993, in the name of inventor Robert C. Byrne, and incorporated herein by reference, has a tamper resistant structure laid down in a pattern which would cover portions of the SPU, but expose others so that etching away the tamper resistant structure destroys the exposed portions. Thus, the SPU would not be easily disassembled or reverse engineered, because the tamper resistant structure would hide the active circuitry and removal of the tamper resistant structure would destroy the active circuitry. This physical coating would act as a natural adjunct to the Metallization Layer Detector (FIGS. 11–13).

Another security feature that could prove useful is disclosed in application Ser. No. 08/251,230, "Secure Non-Volatile Memory Cell", filed May 31, 1994, in the name of inventors Max Kuo and James Jaffee, also incorporated herein by reference, which has an EEPROM cell providing protection against external detection of the charge stored within the cell by causing any stored charge to dissipate upon the attempted processing of the cell. This type of EEPROM might fulfill the role of the ROM 7 block, or possibly even substitute for the Inverting Key Storage described earlier (FIGS. 9,10).

b. Implementation of the Detectors.

i. Photo Detector.

If secure information resides in registers or memory of a VLSI device, often an attacker finds it fruitful to remove the packaging of such a device to impact such storage devices directly. This facilitates the investigation of the design architecture and makes it possible to probe internal nodes in an attempt to discover the secure information. Such package removal, or de-encapsulation, will thus likely expose the die to ambient light, even if inadvertently on the attacker's part. Detecting such light could act as input information for suitable responsive countermeasures to take place.

The construction of a light-sensitive device can be implemented in many standard CMOS processes without any extra masks or steps. For example, lightly doped N-type material exhibits a conductivity proportional to the amount of light to which the material is exposed.

Referring to FIG. 1, the Photo Detector 16 signal passes through the Silicon Firewall 20 before setting a bit in the Status Register 11. A plurality of such detectors may be placed at strategic places within the SPU, which may be used to localize and further characterize the nature of any intrusion.

ii. High/Low Temperature Detector.

The normal temperature operating range for the SPU is 0° C. to 70° C. Any temperature above this range, in most applications, might well be considered to be the result of an intrusion attempt by an attacker, as for example, the heat generated by grinding away at the chip's outer layer. A substrate diode, well-known to the art, should be sufficient for detecting temperature changes, although any other comparable device known to those of ordinary skill in the art for performing temperature measurement should suffice.

With reference to FIG. 1, the Temperature Detector 17 signal passes through the Silicon Firewall 20 before setting a bit in the Status Register 11. Nothing in accordance with this invention precludes a multi-bit field characterizing a temperature scale, or a plurality of such detectors, to characterize any temperature differentials within the SPU.

iii. Metallization Layer.

Modern day integrated-circuit analysis equipment is able to probe the contents of an integrated circuit while power is applied to the circuit. As a result, it is possible to detect a key, or other secret data for that matter, which is stored in volatile memory. One way to protect the secret key is to cover the key with a metal layer which is able to deflect probing signals directed thereon. However, this metal layer could be removed or altered fairly easily by an attacker. Consequently, protecting the key through the use of a metal layer, as contemplated in the prior art, is rather ineffective.

One way to enhance the security of the metal layer is for the SPU to contain means for detecting any alteration of the metal layer which covers the key, or any particularly sensitive data for that matter. The SPU can then take actions to respond to the alteration. One embodiment of the invention is shown in FIG. 11. The metal layer is divided into many metal traces, shown in FIG. 11 as parts 852–857. Each trace is connected to an output pin of a latch 860 and an input pin of a latch 862. These two latches are connected to the system bus 868, which is in turn connected to the Micro Controller and the memory. They are also connected to the Status Register 11. Traces 852 and 853 pass over a first area 864, traces 854 and 855 pass over a second area 865, and traces 856 and 857 pass over a third area 866.

During a system bus cycle, the individual output pins of latch 860 are driven to either a logic high or a logic low, depending on the value of a random number generator (either implemented in hardware or software). As a result, the traces 852–857 should be set to a corresponding logic high or a logic low value. At a later bus cycle, latch 862 latches in the logic levels of traces 852–857. If any of the latched logic levels are different from the logic level originally driven by latch 860, it is assumed that an attack has been mounted on the SPU.

Another embodiment of the invention is shown in FIG. 12. The metal layer is again divided into many metal traces, shown in FIG. 12 as numerals 902–904. These metal traces are connected to a logic high potential. FIG. 12 also contains a plurality of AND gates, shown as numerals 906–908, and a plurality of memory cells 913–916. Each of the AND gates 906–908 has one input terminal connected to one of the traces 902–904 and one output terminal connected to one of the power lines 910–912 of memory cells 914–916, respectively. The other terminals of each of AND gates 906–908 are connected to power lines 909–911, respectively. These power lines 909–911 could feed off VPP 24, for example.

When the metal traces are in their normal condition, i.e., connected to a logic high potential, the inputs of the AND gates are in a logic high potential. Thus, all the memory cells are powered by the outputs of the AND gates. However, if any one of the metal traces is removed, the output of the corresponding AND gate will be changed to a logic low, which turns off the associated memory cell. Since the output of an AND gate is connected to the input of an adjacent AND gate, the output of the adjacent AND gate becomes a logic low, which turns off the memory cell associated with the adjacent AND gate. This sequence of events propagates until all the outputs of the AND gates become a logic low. As a result, all the memory cells are turned off resulting in the destruction of the data stored therein. This embodiment does not require any action of the Micro Controller and could amount to a last-ditch defense.

A third embodiment of the invention is a LATN cell, shown in FIG. 13 as 920. LATN cell 920 is essentially a latch with a weak feedback path so that any intrusion in the cell will cause the cell to toggle. A control signal on line 925 is applied to a transmission gates 924 and, through an inverter 926, to another transmission gate 924. As a result, only one of the transmission gates is turned on at a time. When transmission gate 922 is turned on, a data signal on line 927 passes through an inverter 928 to output inverters 929 and 930. An inverter 931 is connected to inverter 929 in order to provide an inverted output. When transmission gate 922 is turned off, the data signal is no longer connected to the output inverters. However, the output signal retains its value because of the feedback provided by an inverter 932 and transmission gate 924.

One of the important features of the LATN cell 920 of the present invention is that the feedback inverter 932 has weak output power. Thus, if the LATN cell 920 is exposed to radiation introduced by a probe, the feedback path is broken and the output value of LATN cell 920 would not be maintained.

In all of these embodiments, the outputs thereof could be used as detectors, as symbolically represented by Metallization Layer Detector 18, feeding their signal through the Silicon Firewall 20 to the Status Register 11. It should not be ignored that the Metallization Layer itself provides a passive defense to probing, as discussed below.

iv. RTC Rollover Bit and the Clock Integrity Check.

As discussed above, the Real Time Clock 5 uses a 32.768 KHz crystal to drive a Ripple Counter 248 which keeps UNIX time. Were one to replace this crystal with a frequency source several orders of magnitude higher, while the SPU is operating under battery power only, one could conceivably roll the counter over a predetermined number of pulses to the point where, when system power is reapplied, the Micro Controller 3 would not be able to detect that any discernable amount of time had passed since the previous time it was turned on. The implications for various applications is serious, as for example: metering information, where the time the information was actually used and the time subsequently charged for such use would have little bearing on each other.

Prior art solutions to detect clock tampering have the drawback that they require the entire system to be always up and running; typically, however, in order to minimize power consumption in times of non-use, most of the system is powered down while the real-time clock continues to run from batteries. Thus, the problem is to create a mechanism that can detect tampering of a real time clock without the use of the external system, such mechanism to be contained wholly within the real time clock for security reasons, and be a minimal drain on the total power.

In the present invention, referring to FIG. 1, this problem is solved by the provision of a rollover bit in the Status Register 11, set by the ROLLOVER 34 signal. This rollover bit is configured to be read/write mask, i.e. it can only be cleared by writing a one to it when it already is set to one, and this write may only come from the Micro Controller 3, a feature which enhances security. The Rollover 34 signal is generated by the Real Time Clock 5 described above. The 32 bits of the SC 305 output, as per FIG. 8, represents a carry-over at $2^{32}$ cycles, corresponding to about 136 years when operating in conjunction with a 32.768 KHz crystal. This is well within the contemplated lifetime of any SPU product. Even clocking the circuit at something like 32.768 MHz, three orders of magnitude higher, were this tolerated by the oscillator circuitry would result in a rollover after every 49.7 days, a long time for a would-be attacker to wait, and even then such attacker would be foiled by the rollover bit feature, as a rollover should never occur within the contemplated lifetime of the product, as just discussed. Resorting to a second rollover would not work, as the rollover bit cannot be cleared by a second carry-over, as just described.

This approach has the advantages of its low cost of implementation, the small amount of SPU real estate it requires, and its compatibility with a simple ripple counter architecture, yet not inviting additional security risks.

Figure 14A:
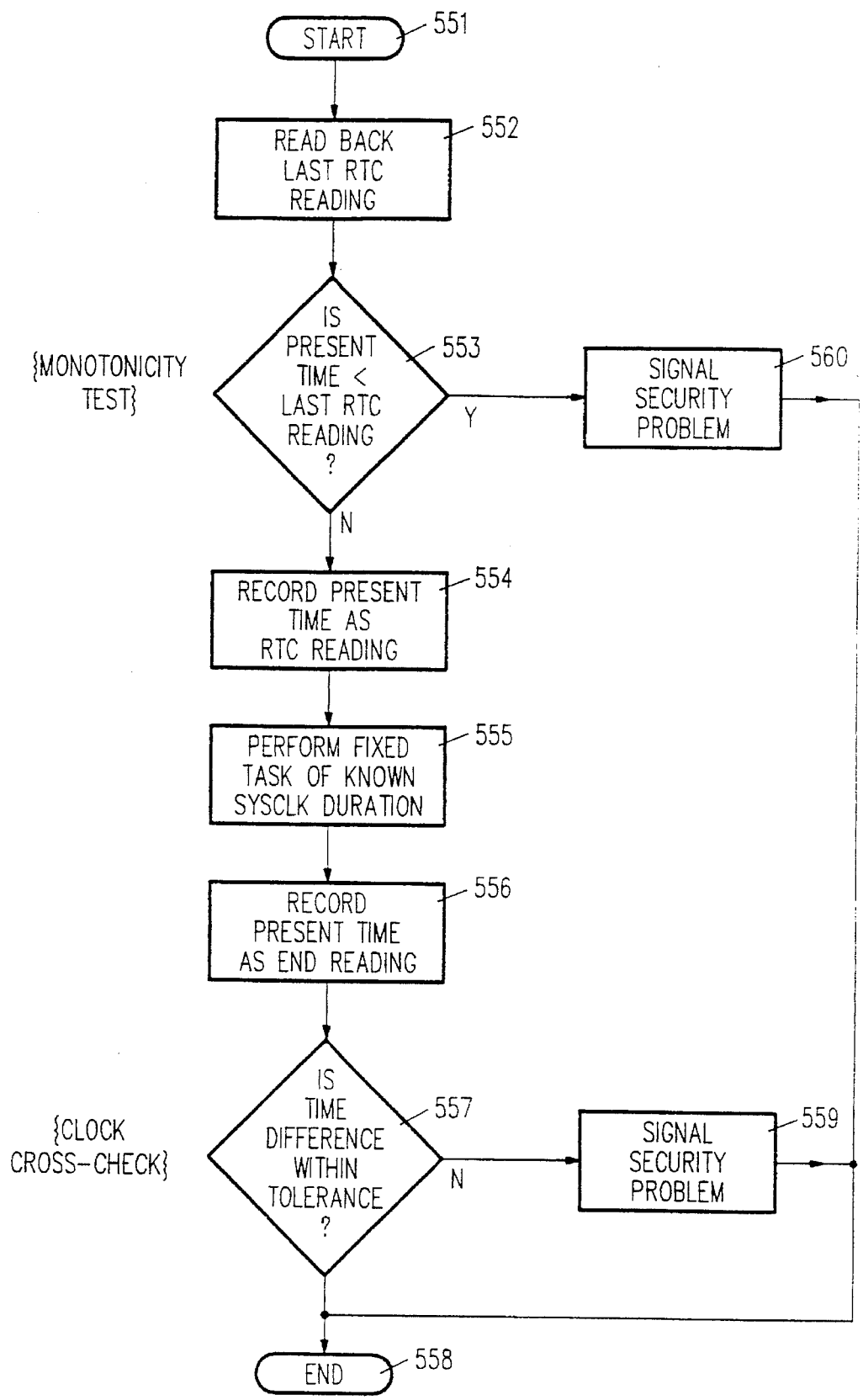
FIG. 14(a) is a flowchart of the firmware process for performing the Clock Integrity Check.

The security offered by the RTC Rollover Bit is supplemented by a general clock integrity check as shown in FIG. 14(a). The process begins at step 551 by reading back from RAM 8, or some special register, a prior readout of the Real Time Clock 5 stored by this process 552. A monotonicity test is performed by comparing the present time with the prior stored reading 553. If the present time is less, a security problem has arisen and is signalled 560 and the process should then terminate 558. If the present time is indeed greater, then it is stored for a future monotonicity test 554. Next, a fixed benchmark performance test is conducted 555; many of these types of tests are well-known in the art and need not be alluded to here. The important thing is that such test take a given number of system clock cycles, CTTL 25, such length established during production time testing or alternatively, clocked at run time for the given number of cycles. At the completion of the benchmark test, the completion time, as measured by the Real Time Clock 5, should be stored 556. Thus, the benchmark test elapsed time, as measured by the Real Time Clock 5, can be calculated and compared with the number of CTTL 25 clock cycles. The initial calibration of the System Clock 2, that is, the setting of its operational frequency, should provide the necessary conversion factor between the Real Time Clock 5 and the System Clock 2, allowing such a comparison. As described earlier, the System Clock 2 also exhibits a considerable degree of variability with temperature; thus, the time comparison should take into account some operational tolerance 557. If the comparison falls outside this tolerance, the security problem should be signalled 559, but in either case the process would then terminate 558.

v. VRT Security Bit and the Power Integrity Check.

The VRT Security Bit is provided to inform the system that both the battery and system power have simultaneously dropped below an acceptable voltage, for example 2 V. When that occurs, any volatile storage information, as well the time count in the Real Time Clock 5 may be lost. References to RAM 8 in this context will be deemed to include off-chip RAM powered by VOUT 23. Referring to FIG. 1, the VRT bit may be implemented as a special bit in the Status Register 11, with voltage detection circuitry tied to VPP 24, such as pull-up or pull-down resistors, designed to make the bit go low in the absence of sufficient voltage. Thus, the VRT bit is cleared by the Power Block 13, and is only set by the Micro Controller 3 via Status Read/Write lines 36. The VRT bit is used in conjunction with rewritable-memory modification detection codes on the RAM 8, to perform an overall integrity check on the battery-backed section of the SPU. The modification detection codes may be any one of an assortment of suitable codes, as is well-known in the art, from a simple checksum, to a cyclic redundancy check (CRC), to more elaborate algorithms such as MD5 owned by RSA Data Security, Inc., each affording different levels of security, compactness and error recoverability. For example, a simple checksum, while easy to implement, allows a large degree of freedom for an attacker to overwrite the contents of RAM 8 while preserving the same overall checksum. Whichever modification detection code is used, the code result is conventionally stored along with the RAM 8 it is measuring.

Figure 14B:
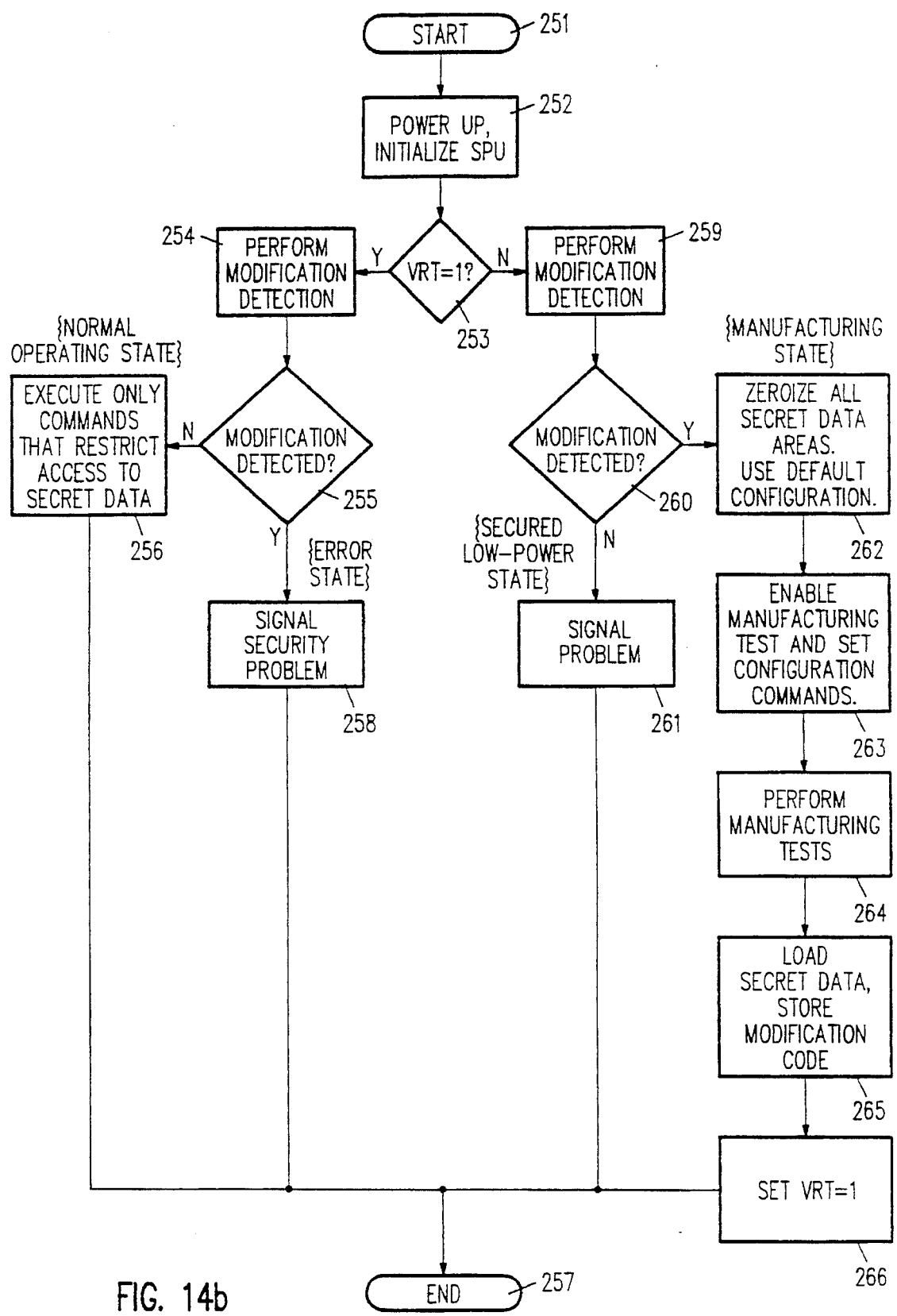
FIG. 14(b) is a flowchart of the firmware process for performing the Power Integrity Check.

With reference now to FIG. 14(*b*), the general power integrity check process 251 will be described. As the SPU is powered up, the Micro Controller 3 performs the necessary initialization operations on the SPU 252. Then, the Micro Controller 3 polls the Status Register 11 to ascertain the state of the VRT bit 253. If the VRT bit is set to 1, a modification detection operation on the RAM 8 is performed 254. Then, the SPU determines if any modification has been detected 255. If not, the SPU is said to be in its normal operating state, and thus should only implement commands that give restricted access to its secret data 256, and the process then exits 257.

If a modification has been detected, the SPU is in an error state and so the security problem is signalled 258 and the process exits 257.

If the VRT bit is set to 0, a modification detection operation is also performed 259. If no modification is detected, the SPU is in a secure, albeit low power state; in other words, although the RAM 8 presently checks out, the power cannot be trusted and so this problem should be signalled 261 and the process exits 257.

Finally, there is the scenario where modification was detected, yet VRT is 0—this modification detection is spurious as the RAM 8 is in a random configuration, i.e. it is said to be in the manufacturing state. The following is a description of a response taken in one embodiment of this invention, and should not be read to preclude any number of possible responses in this state. In this one embodiment, the SPU could zeroize all secret data areas and use the default operational configuration parameters, such as the lowest System Clock 2 oscillator frequency, stored preferably in the ROM 7, to operate in the most trustworthy state 262. The SPU then could enter a mode whereby manufacturing tests may be performed and the configuration parameters may be set 263. Then, any manufacturing tests may be performed in order to guarantee the reliability of the SPU 264. Once those tests have been made successfully, the secret data, such as the keys, may be loaded, and a modification detection code performed on the entire contents of RAM 8 and stored therein 265. Finally, the SPU will set the VRT bit to 1, putting it into the normal operating state 266, after which the process may exit 257.

vi. Bus Monitoring Prevention.

With PDPS one is concerned with protecting secret information which, among other objectives, implies thwarting any attempt to monitor the internal data transactions that carry secret information. It is axiomatic that a device incorporating PDPS must have input and output ports, taking in data, performing operations on this data using the internal secret information and then outputting the resulting data. If an integrated circuit could be altered in such a way that the secret information contained in the device could be extracted through an input or output port, or if a random failure within the device caused this to happen, then the PDPS system would no longer be secure.

Prior solutions for keeping secret information have involved restricting such information to within the confines of a single integrated circuit chip, thus preventing an interloper with standard evaluation tools from monitoring interchip data traffic and thereby discerning the secret information. This confinement approach required a high degree of chip integration, in order that all functions needing the secret information are implemented on the same piece of silicon. Also, input and output ports of these integrated circuits would need to be disabled while secret information was being internally transferred.

The prior solutions relied on the difficulty in modifying already complete manufactured integrated circuits. This is no longer the case, as semiconductor evaluation tools have drastically improved in their sophistication and capabilities. It is now possible to modify parts of an integrated circuit without damaging the other parts or the chip's overall function. Thus, a device which would keep its secret information on internal buses only, could now be modified to transfer that information to its input or output ports. This is a lot easier to implement than creating specially-made probes to tap into the internal bus. It should be repeated that even random failures within an integrated circuit have been known to result in a similar scenario. In both cases, therefore, monitoring the input and output ports would allow the secret information to be determined.

The basis on which to combat this problem, in the present invention, is to create a mechanism internal to the chip that verifies that the original design of the input or output circuitry has not been modified by either an attack or random failure, before bringing out any secret information onto the internal bus. This is accomplished by interrogating critical circuit components to ensure that they are intact and functioning correctly. The detection of a security breach could thus be acted upon accordingly, but at the very least, the bus should be disabled from bringing out any secret information. Also, the secret information should be brought out in several pieces, which has the virtue that, were a random hardware fault to occur precisely when secret information was brought onto the internal bus, then only a small and probably useless portion would be compromised.

The SPU contains ports that allow data to be transferred from an internal secure bus to external buses. The implementation is brought about, in one embodiment, with special circuitry that is added to the input/output ports and special routines in firmware that are executed by the internal Micro Controller. The internal Micro Controller keeps an internal copy of the last data written to the output register of that port. The internal Micro Controller reads the contents of both the input and output registers; typically, only the input registers can be read by the internal Micro Controller. Before bringing secure information onto the bus, the Micro Controller interrogates the port to ensure that the last valid data written to the port is still in place; otherwise, the Micro Controller does not bring secret information onto the bus. If valid data is in place, then a portion of the secret data is brought onto the bus and transferred internally as necessary. The port is again checked to ensure that valid data is in place in the input/output port's output register. If the secret data, or any other data, is detected in the ports then the Micro Controller does not bring any other secret information onto the bus. This is continued until all secret information is transferred to its internal destination.

Figure 15:
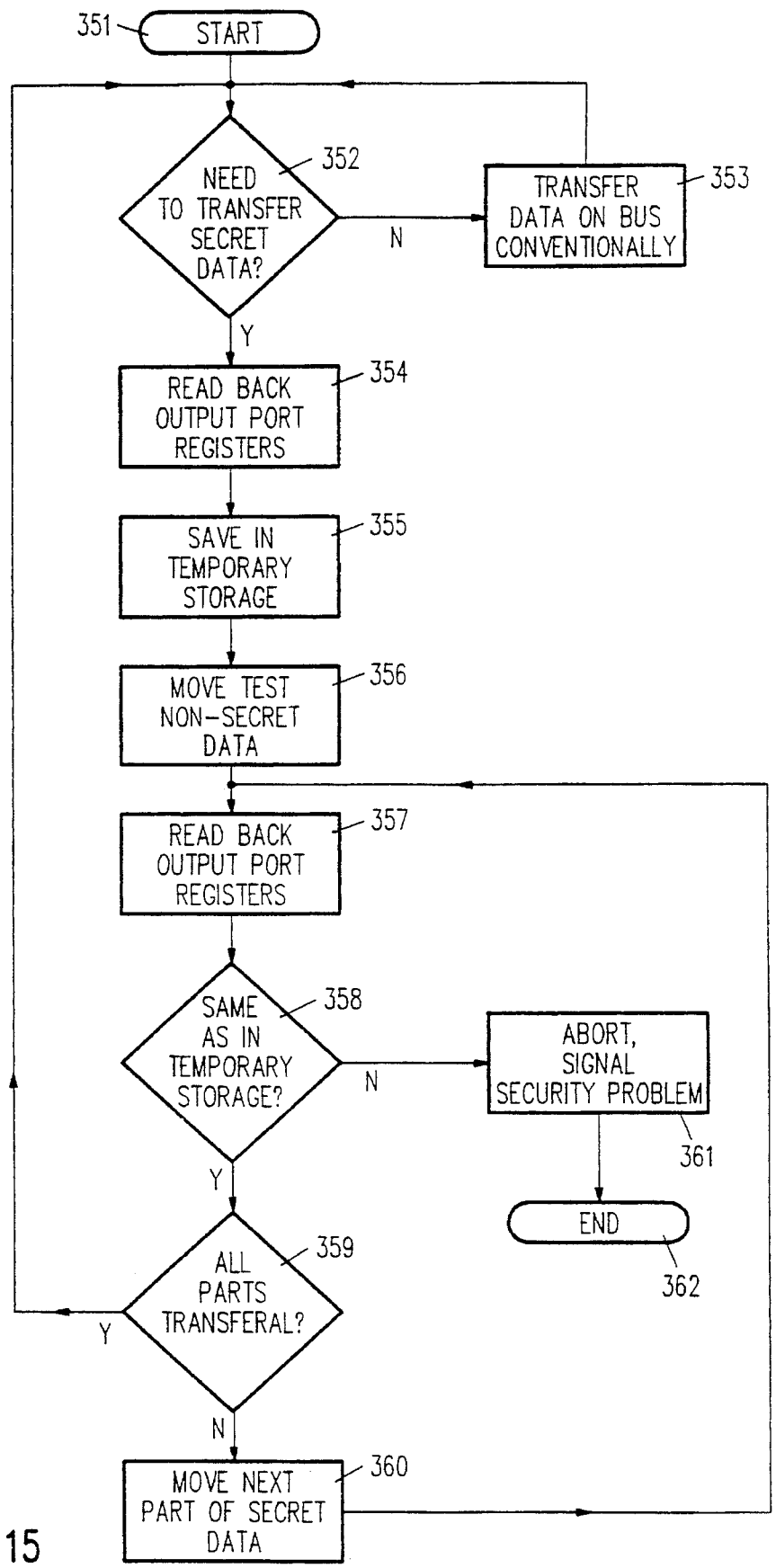
FIG. 15 is a flowchart of the firmware process for performing the Bus Monitoring Prevention.

It should be noted that the use, or non-use, of the Bus Monitor is a process controlled from firmware. Referring to FIG. 15, this process shall now be described in detail. Upon the Start 320, the Micro Controller 3 determines whether secret data needs to be transferred onto the Internal Bus 10 in step 352. If not, data may be transferred on the Internal Bus 10 in the conventional manner 353. If secret data is to be transferred on the Internal Bus 10, the Micro Controller 3 reads back the output port registers 354, and stores them in temporary storage 355. In one embodiment, before secret data is moved onto the Internal Bus 10, non-secret data is sent over the Internal Bus 10 as a test 356. The output port registers are again read back 357, and compared with the previously stored read back 358. Should they prove different, the process aborts and signals the security problem 325 and exits at step 362, but if they are the same, the process may proceed, as part of a loop, to determine whether any and all parts of the secret data have already been transferred on the Internal Bus 10 in step 359. If not, the next part of the secret data is moved on the Internal Bus 10 at step 360 and then the process loops back to step 357 to read back the output port registers again. If all parts of the secret data has been transferred, the process loops back to step 352 to control further data transfers on the Internal Bus 10.

This approach has the virtue of relatively low cost implementation, without any special semiconductor processing. It also guards against combined physical and electrical attacks, as well as random failures. This system, by being implemented in multiple blocks within the integrated circuit, in conjunction with firmware operated by the Micro Controller, would be expensive and difficult to reverse engineer.

vii. Trip Wire Input.

Many of the concerns regarding attack on the input/output pins of the SPU, described above in the context of the Bus Monitor Prevention, may be addressed through monitoring of just these pins, providing cryptographic alarms or trip wires to just those kind of attacks. An attacker may be monitoring any given pin, to determine its functionality. The PINs 32 of the I/O Port 1, being programmable, are ideally suited to detect any such unexpected read or writes. Furthermore, they may be used not only to detect an attacker usurping these PINs 32, but may also be used as inputs from off-chip external detectors, such as a battery of photo detectors arrayed inside a PCMCIA card.

Figure 16:
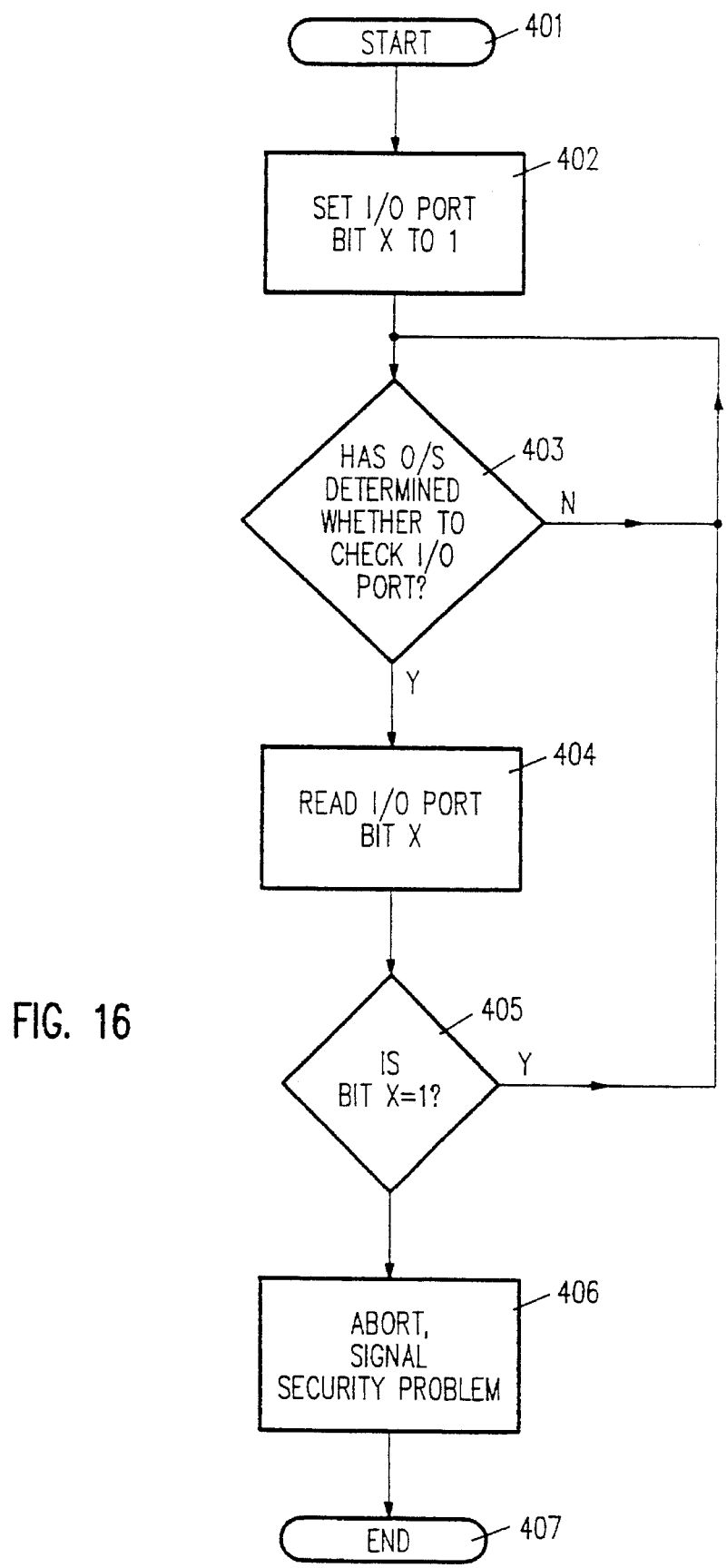
FIG. 16 is a flowchart of the firmware process for performing the Trip Wire Input.

With reference to FIG. 16, the process that begins at step 401 will now be described in detail. A given bit, the Xth bit, on the I/O Port 1 is set to a 1 402. The process waits until the operating system has determined it is time for the I/O Port 1 to be checked 403. This should take into account, for instance, when such pin needs to be used for regular I/O operations. When such time arrives, the Xth bit is read 404 and checked if it is still a 1 405. If so, the process may return to its wait state at step 402. Otherwise, the process aborts and signals the security problem 406, and the process exits 407.

viii. Software Attack Monitor.

One of the least expensive ways to defeat the security system in a hardware device (which may contain a plurality of components such as a microprocessor, PAL's, etc.) is to mount a random data electronic attack on the hardware device. Specifically, an attacker could send signals (which may be commands, data, or random signals) to the input pins of some of the components in the device and monitor the output pins of the same and/or different components. This kind of attack requires little or no special hardware, and the attacker may be able to learn confidential information contained in or protected by the hardware device.

A typical attack strategy is now described. An attacker would monitor the hardware and software operation of the components for some period of time during normal operation. As a result, the attacker could determine the normal command structure of the programmable components in the hardware device. The attacker would then create his/her own command sequences (e.g., by slightly modifying the commands or the command operators, or even creating entirely different commands) based on the information obtained. The reaction of the components to these command sequences is then recorded, as thus building up a "characterization database." As the operation of the components becomes understood, the signals sent to the components are no longer random but are designed to identify commands that could defeat the security of the system.

It can be seen from the above attack strategy that the components in the hardware device, including the microprocessor, will receive a large number of invalid commands, at least during the initial phase of the attack. Consequently, one aspect of the present invention is for the SPU to detect the occurrence of an excessive number of invalid commands and to take appropriate actions to defeat or hinder the attack. One should bear in mind that some perfectly innocent functions generate a series of invalid commands, as for example, when a computer upon boot-up interrogates all peripheral devices and ports to determine if they are present and active.

One means by which to measure an "excessive number" of invalid commands is to determine the number of invalid commands per unit time. The appropriate time unit can be determined by: (1) the rollover time of a counter driven by an oscillator, such as RTCLK 29; (2) a predetermined number of ticks of the Real Time Clock 5; or (3) a software timing loop. If the number of invalid commands per unit time exceeds a predetermined value ("limit parameter"), appropriate action will be taken by the SPU.

Figure 17:
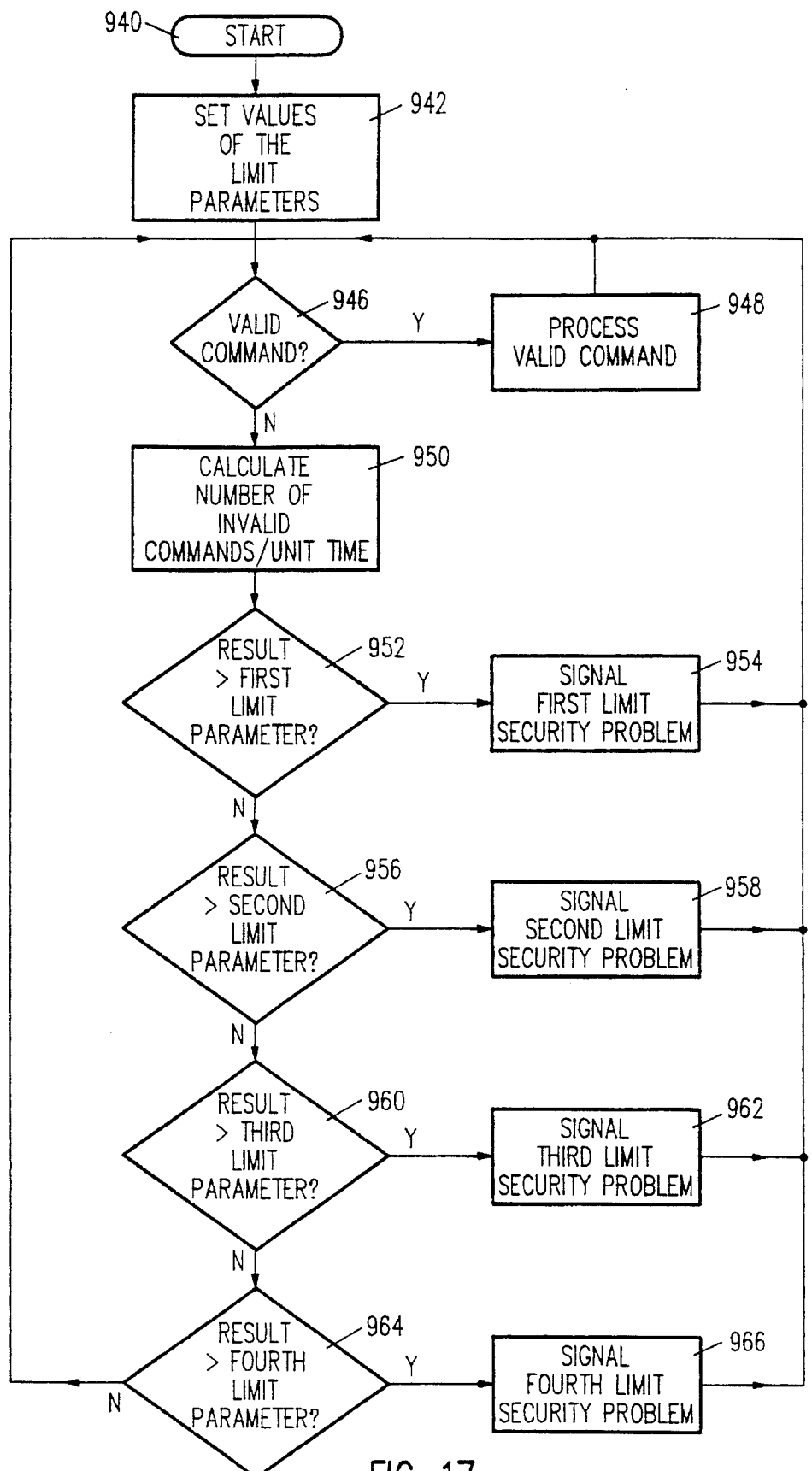
FIG. 17 is a flowchart of the firmware process for performing the Software Attack Monitor.

In some situations, it may be preferable for the SPU to set several limit parameters, each having an associated action. FIG. 17 contains a flowchart 940 which includes four limit parameters. Note that the number of limit parameters is illustrative only, and any number of limit parameters may be used. The flowchart begins at step 940 and then sets the values of each of the four limit parameters 942. The flowchart then branches into a loop consisting of blocks 946–966.

In block 946, the SPU determines whether a command is valid. If the command is valid, it is processed in the regular manner (block 948). The flowchart then branches back to block 946 to fetch and examine another command. If the command is not valid, flowchart 940 goes to block 950, which calculates the number of invalid command per unit time. The result of the calculation is compared with the first limit parameter (block 952). If the result is less than the first limit parameter, then no tamper-reactive action is taken, and the flowchart branches back to block 946 to process the next command. If the result is larger than the first limit parameter, the process generates a signal indicating a first level security problem (block 954).

The flowchart then branches to block 956, which compares the number of invalid commands per unit time with a second limit parameter. If the number is less than the second limit parameter, then no additional action is taken, and flowchart 940 branches back to block 946 to process the next command then. If the number is larger than the second limit parameter, the process generates a signal indicating a second level security problem (block 958).

The flowchart 940 then branches to block 960, which compares the number of invalid commands per unit time with a third limit parameter. If the number is less than the third limit parameter, no additional action is taken, and flowchart 940 branches back to block 946 to process the next command. If the number is larger than the third limit parameter, the process generates a signal indicating a third level security problem (block 958).

The flowchart 940 then branches to block 964, which compares the number of invalid commands per unit time with a fourth limit parameter. If the number is less than the fourth limit parameter, no additional action is taken, and flowchart 940 branches back to block 946 to process the next command. If the number is larger than the fourth limit parameter, the process generates a signal indicating a fourth level security problem (block 958).

It is of course up to the supervisory program to decide what steps to take in response to signals of the various limit security problems. The SPU can be programmed to take any or all appropriate actions.

c. Programmable Security.

The Programmable Distributed Personal Security System is based on the orchestration of three conceptually distinct, but nonetheless, interrelated systems: (i) detectors, which alert the SPU to the existence, and help characterize the nature, of an attack; (ii) filters, which correlate the data from the various detectors, weighing the severity of the attack against the risk to the SPU's integrity, both to its secret data and to the design itself; and (iii) responses, which are countermeasures, calculated by the filters to be most appropriate under the circumstances, to deal with the attack or attacks present. The selection of responses by the filters would be said to constitute the "policy" of the SPU. The present invention permits a wide capability in all three of the detectors, filters and responses, allowing a great degree of flexibility for programming an appropriate level of security/policy into an SPU-based application.

The effectiveness of this PDPS trio is enhanced significantly by the other design features of the SPU architecture disclosed herein, for example: the Power Block 13, Power Isolation 13, Silicon Firewall 20, System Clock 2 and Real Time Clock 5, and the Inverting Key Storage. Although the implementation of some of these features creates security barriers, which do not strictly fit into the detector/filter/response paradigm, the presence of these barriers certainly slows or even thwarts an attacker's progress, allowing for more time to detect an attack, filter out the characteristics of such attack and thus make a more measured response thereto.

i. Detection.

A wide variety of detectors have already been disclosed— some implemented in hardware, others in firmware. Some may bear witness unambiguously to an actual physical intrusion into the SPU, such as the Metallization Layer Detector 18; others such as the Photo Detector 16 may be triggered by noninvasive means such an X-ray of the SPU, or by very invasive means, such as the actual de-encapsulation of the chip. Again, the purpose at this stage is not to decide on the course of action, nor even to coordinate all related information; it is simply to report the detection and move on.

Figure 18:
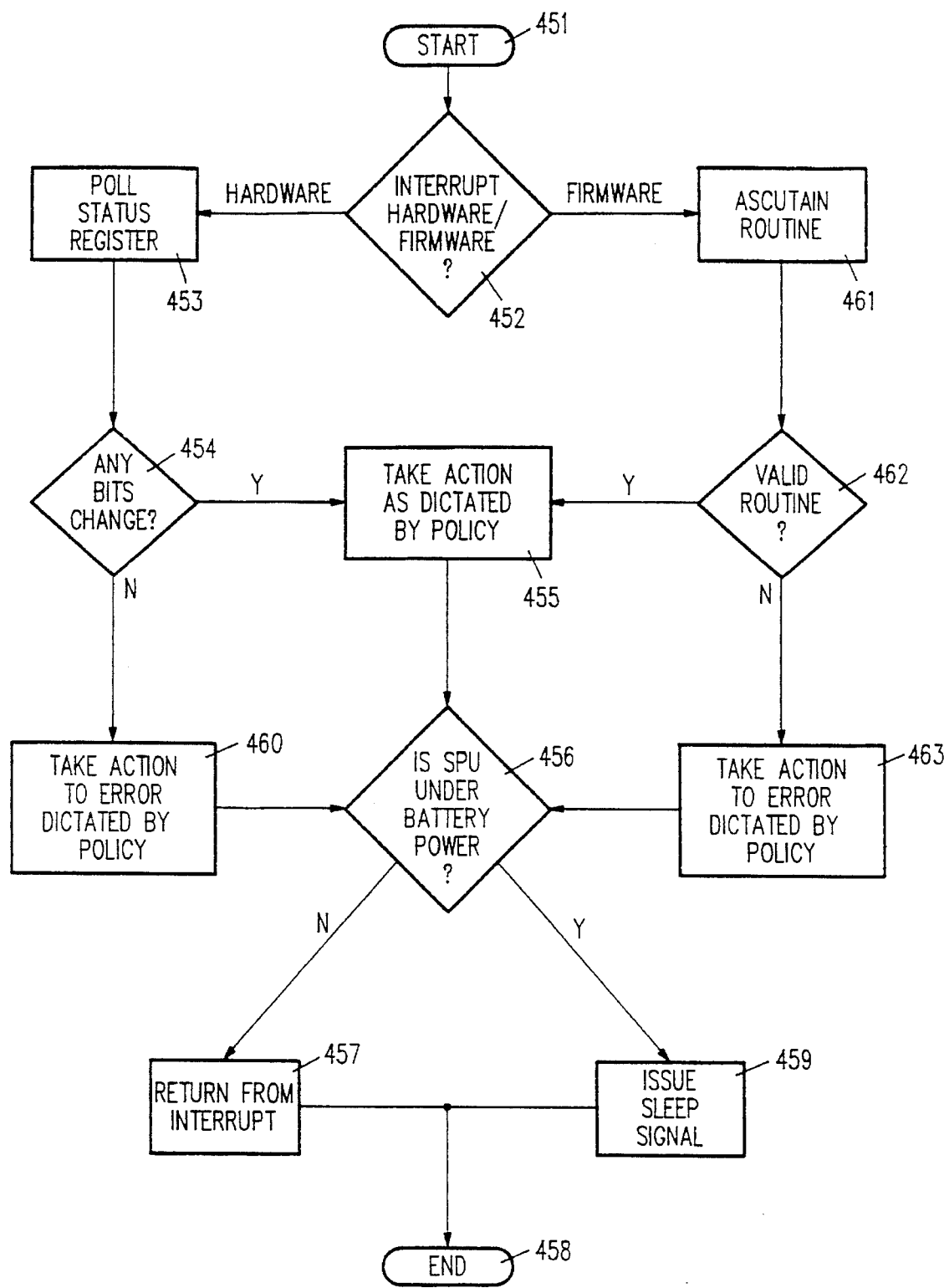
FIG. 18 is a flowchart of the firmware process for performing the Detection Handler.

Referring to FIG. 18, the process of how detectors are generally handled will now be described. The process begins 451 by a decision of whether the detector signal is generated by hardware or firmware 452. The exact nature of how this step is taken is unimportant. Here it is represented by an interrupt generated in the Micro Controller 3, but it could just as easily be based on some periodic polling of registers or any equivalent method well-known to practitioners in the art. Even the distinction between firmware and hardware detectors is at a certain level irrelevant, as the parallelism present in FIG. 18 shows. If the interrupt was generated by hardware, the Status Register 11 would then be polled 453. In this implementation, the key to determining whether indeed any hardware detector was activated was that one or more bits of the Status Register 11 should have changed from the last time it was read 454. If so, the SPU could then take actions as dictated by its programmed policy 455. If not, either an error has occurred owing to a false detection or certain operational features are in play, such as the signal owing to a periodic wake-up of the SPU under battery power. In either case, action dictated by policy, given such an error or feature, should then be taken 460. Alternatively, at step 452, had the signal originated in firmware, the process would set about determining the routine generating it 461. If such routine proved to be a valid one 462, again action should be taken as dictated by policy 455. Otherwise, action consistent with this error or possible feature should be taken, again as dictated by policy 463. All the aforementioned scenarios thereafter converge. If, in accordance with one alternate embodiment disclosed herein, an alarm wake-up capability is provided, and the process was invoked owing to such an alarm 456, the process would then generate the SLEEP 41 signal 459 and terminate 458. Otherwise, the process would return from interrupt or whatever housekeeping required in accordance with the particular implementation used 457 and then terminate 458.

ii. Filtering.

The programmable filtering process lies at the heart of PDPS; without it one merely has hardwired and indiscriminate responses to various attacks. With reference to FIG. 19, this process itself consists of two stages: (i) correlating signals produced by the various detectors to ascertain the attacks involved (FIGS. 19(a), 19(b), 19(c)); and (ii) based on the attacks involved, to select an appropriate response (FIGS. 19(d), 19(e), 19(f)). There are, of course, operational factors involved at both stages of this process. These factors may be static and intrinsically related to the type of application, the architecture of the SPU, etc., or they may be dynamically varying and related to, for example: (i) the prior history or frequency of detected signals, responses, or all events; (ii) the present state of the SPU; (iii) the present stage or mode of the application; (iv) the potential harm a given attack may represent; or (v) combinations of factors or detectors, for example, coming from a given set, occurring in a particular order, or occurring within a fixed time frame.

Figure 19A:
FIG. 19 is a simplified representation of the stages of the Filtering Process, including correlating the detectors and selecting the responses.
Figure 19B:
Figure 19C:
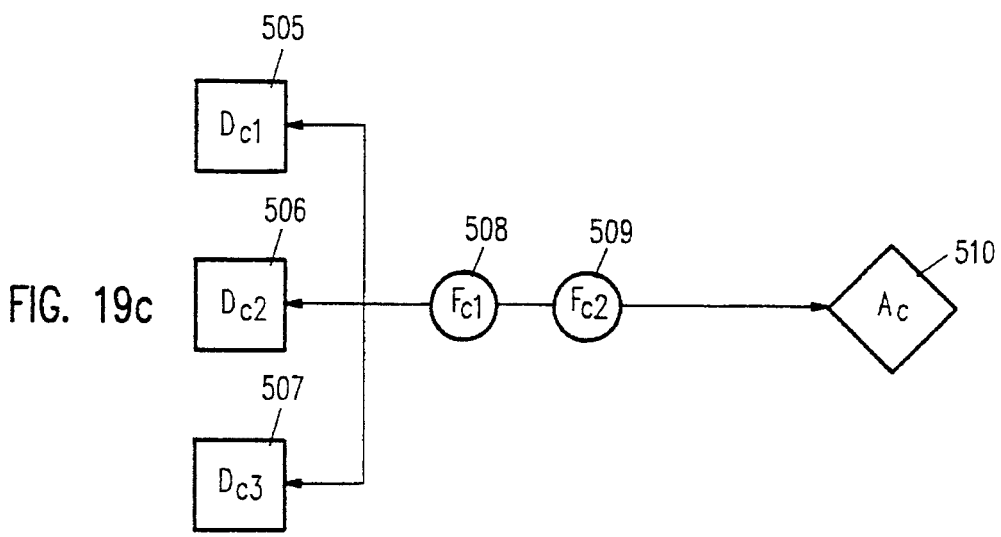
Figure 19D:

The conditions whereby the detectors are correlated are as follows. In FIG. 19(a), a false alarm condition is shown. A signal is detected, $D_a$ 501, without corresponding to any real attack, $A_0$ 502. There are various means by which such a false alarm could be discerned. For example, the detector producing the $D_a$ 501 signal could be polled once more to determine whether the first reading was spurious or not. Alternatively, it may be inferred from the state of other detectors. Such a scenario will be discussed in the context of FIG. 19(c). FIG. 19(b) demonstrates an opposite extreme, where a signal $D_b$ 503 corresponds unambiguously to one attack, $A_b$ 504. However, most attacks will be characterized as in FIG. 19(c), where each of one or more detectors, $D_{c1}$ 505, $D_{c2}$ 506 and $D_{c3}$ 507, in conjunction with zero or more factors, $F_{c1}$ 508, $F_{c2}$ 509 are required to fully characterize a given attack, $A_c$ 510.

Figure 19E:
Figure 19F:
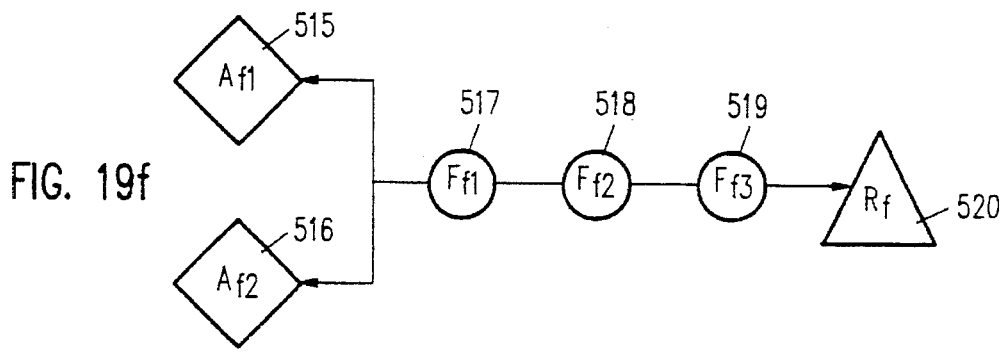

The selection of responses to attacks fall into the following categories. There is, of course, the non-response $R_0$ 512, in FIG. 19(d), whereby no action is taken for a given attack, $A_d$ 511. This may owe to a lack of capability, a deliberate design choice, or an application decision. In FIG. 19(e), analogous to the unambiguous condition of FIG. 19(b), there is the unconditional response $R_c$ 514 to an attack $A_c$ 513.

This may represent a last-ditch scenario, where all outer defenses have been breached and some unequivocal and serious countermeasure needs to be taken. On the other hand, it may also be an application decision. Finally, in FIG. 19(f), there is the general scenario where one or more attacks, $A_{f1}$ 515, $A_{f2}$ 516, in conjunction with zero or more factors, $F_{f1}$ 517, $F_{f2}$ 518, $F_{f3}$ 519, must have been or are present, in order to select the response $R_f$ 520.

By custom tailoring the correlation of the detector signals, as well as the selection of the responses, a programmable security system can be application—as well as environment-specific.

iii. Responses.

The final system of PDPS involves the provision of a wide variety of responses, to allow for a rich and full set of countermeasures to any conceivable attack scenario. These responses can be categorized into five major groups: (i) passive; (ii) alarms; (iii) decoy activity; (iv) restriction of access; and (v) destructive. Examples of each are given in TABLE I, which is meant to be an illustrative, but by no means exhaustive, list.

TABLE I

Examples of Typical Responses

| Passive | Alarm | Decoy | Restricted Access | Destructive |
|---|---|---|---|---|
| Non-response | Signal local computer | Random command response | Disable SPU for period of time | Destroy keys |
| Log attack internally | Signal remote computer | Random external bus activity | Require recertification | Destroy secret data |
| | Set I/O Port pin high | | Disabling use of keys, passwords | Disable SPU permanently |

A passive response would be one where the SPU conveys no external signal, nor functions in any observable manner differently from its normal mode of operation. This would of course include the classic "non-response" discussed earlier, but also an on-board logging of the attack with, its type, timestamp, context, etc.

An alarm response would indeed convey an externally detectable signal. The SPU may signal the calling application, for instance, to alert the user that the SPU is aware of the attack and may have to proceed to more drastic measures if such attack is not discontinued. In a situation where the SPU is connected via a network or modem to some monitoring computer, as for example, in an information metering context, the SPU may signal that remote computer to tell that the local user is attempting to attack it. On the hardware level, an alarm may be implemented simply by setting a particular pin on the I/O Port 1 high.

A decoy response is one that departs from the normal mode of SPU activity. It may indeed mimic valid SPU activity. Examples would be to execute SPU commands, or to generate signals on the External Bus Interface 9, either selected at random or from some predetermined set.

A restricted access response would be to disable some functions from the normal mode of SPU operation. Examples include disabling the SPU totally for some period of time or until recertified in some manner, or disabling operations involving specific keys or passwords.

Finally, there is the destructive response, which disables functionality of the SPU permanently. Examples include destruction in memory, by erasing keys or other secret data, or permanent physical disablement, such as the burning out of internal fuses.

d. Attack Scenarios.

Now that the overall structure of the invention has been laid out, it is fruitful to describe in detail the various attack scenarios, the manner in which they are conducted, the information or effect they wish to achieve or access, the design features of the SPU that would thwart such an attack, factors that are relevant in reacting to such attacks, and finally, responses appropriate to such an attack. A summary of the applicable disclosed SPU features, detectors and responses is to be found in TABLE II. These scenarios are by no means exhaustive, but merely illustrative. All further references, unless specified otherwise, are to elements of FIG. 1.

TABLE II

Summary of Attack Scenarios

| Attack Type | SPU Protective Feature(s) | Triggered Detector(s) | Suggested Response(s) |
|---|---|---|---|
| Electrical Attack on I/O Ports | Silicon Firewall 20 Alarm wake up | Bus Monitor Trip Wire Input Software Attack Monitor Metallization layer detector 18 Photo Detector 16 | Random command response Random external bus activity Disable SPU temporarily Disable SPU permanently |
| Clock Attack | Silicon Firewall 20 System Clock 2 Real Time Clock 5 | RTC Rollover Bit Monotonicity test System/Real Time Clock cross-check Temperature Detector 17 | Use other clock Disable metering functions |
| Key Attack | Battery-backed RAM 8 Metallization layer Inverting key storage | Metallization layer detector 18 Bus Monitor VRT Security Bit | Disable use of keys Destroy keys |
| Physical Attack | Physical coating Metallization layer | Temperature Detector 17 Photo Detector 16 | Disable keys, secret data Destroy keys, secret data |

TABLE II-continued

Summary of Attack Scenarios

| Attack Type | SPU Protective Feature(s) | Triggered Detector(s) | Suggested Response(s) |
|---|---|---|---|
| Combination Attack | Any/all of the above | Any/all of the above | Any/all of the above |
| User Fraud | Silicon Firewall 20<br>Power Block 13 | RTC Rollover Bit<br>Monotonicity test<br>System/Real Time Clock cross-check<br>VRT Security Bit | Signal Local Computer<br>Signal Remote Computer<br>Disable metering functions<br>Require recertification | i. Electrical Attack on I/O Ports.

Arguably, the simplest form of attack would be an electrical attack on the I/O Port 1. This type of attack requires very little special hardware. The attacker simply uses the same system configuration that is used in the normal application, however instead of using the intended software, the attacker creates his own code to interrogate the device. The attacker could go one step further and place monitoring equipment on strategic points in the circuit, as for example, the SPU pins or PAL outputs. This would allow the attacker to more thoroughly characterize the chip in its normal operation, and when it is under attack.

The typical approach would be to monitor the hardware or software for some period of time during normal operation. From this the attacker could determine the normal command sequence. After this characterization, the attacker could then create his own command sequences based on the information he has obtained. He could try to slightly modify the commands or the command operators to get the device to perform different functions. He might also try to issue commands that he did not see before to see how the device would react. All during this process the attacker would be recording the responses to the different stimuli. As patterns are detected, the data that is issued to the device is no longer random but designed to further evaluate the particular operation. This continues until a particular operation is fully characterized. It would be the attacker's intention to identify commands or responses that could defeat the overall system. For example, the attacker might be looking for a reset operation command, and could then issue such command at inappropriate times.

The Silicon Firewall 20 would prevent asynchronous signals from the attacker overwhelming the system. The Software Attack Monitor (FIG. 17) would be very sensitive to the overall characterization process. Possibly appropriate responses, in accordance with the measured stages of the Software Attack Monitor, would be to lead an attacker astray with random responses, or eventual disablement of the SPU.

ii. Clock Attack.

Many applications of the SPU could employ the Real Time Clock 5 advantageously, as for example in information metering. However, the Real Time Clock 5 could be attacked in a variety of ways. The external crystal 15 could be substituted to modify the frequency of the RTC Oscillator 15 and hence the internal Real Time Clock 5. The SPU is designed to perform integrity tasks, one of which is to check the Real Time Clock 5 against the System Clock 2 to see if it is operating in the correct range (FIG. 14(a)). However, in one embodiment, these integrity tasks would be performed only when the entire system is powered; when system power VDD 22 is removed, when only the battery-backed Real Time Clock 5 remains operational. It is at this opportunity that an attacker could attack the external crystal 15 without immediate detection. As the Real Time Clock 5 uses a simple binary ripple counter, an attacker could advance the counter until it rolled over. Subsequently, the attacker could continue to run the clock forward to whatever given time reading he wished. This is analogous to the resetting of the odometer of a used car by an unscrupulous dealer.

The inaccessibility of the Internal System Clock 2 to attack, and the Real Time Clock 5 buffering the time signal through an internal Silicon Firewall, certainly stand as barriers in the attacker's way. The System Clock/Real Time Clock cross-check of FIG. 14(a) would detect any switch on power up. If an attacker tried to set the System Clock 2 off by cooling or heating the SPU, the Temperature Detector 17 would give such approach away, as well as a clock cross-check, hitherto successfully, eventually failing for falling outside the operational tolerance. Furthermore, an attacker attempting to rollover the Real Time Clock 5 would cause the ROLLOVER 34 signal to go off. A possible response would be to use the System Clock 2 to whatever extent possible in lieu of the Real Time Clock 5 should that clock prove untrustworthy. However, that option is highly application-dependent, in an information metering context. A more likely response would be to disable all metering functions.

iii. Key Attack.

Secret information is stored in volatile memory, such as RAM 8 within the SPU, rather than ROM 7. This is done to prevent an attacker from gaining access to this information by simply de-encapsulating the SPU chip and "reading" the schematic. However, when keys or other such secret information are stored in volatile memory within a chip, one can deprocess the chip and detect residual charge in the volatile memory which may reveal the contents stored therein. The act of deprocessing would cause power to be removed from the volatile memory, thus causing the data within the memory to be lost, as the charge decays within the semiconductor. However, if the volatile memory contains the same data for a protracted period of time, charge may build up in the dielectric portion of the memory cell, charge which may be feasible to detect despite removal of power. Also, it may be possible to artificially age the memory device by elevating the voltage and changing the operational temperature of the silicon, thus making the SPU even more susceptible to this memory effect.

As described earlier, the Inverting Key Storage (FIGS. 9, 10) feature would thwart such key attack by averaging out any residual charge. The de-encapsulation process would be rendered more difficult by the presence of the Metallization layer, and the Metallization Layer detector 18 would be set off the moment such layer was cut. The protocol of the Bus Monitor Prevention (FIG. 15), transferring only parts of keys from RAM 8 to the DES Block 6 via Internal Bus 10 would hinder tracing the keys, as well as giving away such attempts. Possible responses might be to disable the keys or other secret data from use, or where the security concerns are very high, or the assault unrelenting, to finally destroy them. Active zeroization could be used to assure such process of erasure is complete.

iv. Physical Attack.

An attacker might try to de-encapsulate a chip in order to reverse engineer it. Simple observation of the chip layout can lead one experienced in the art to determine where the Micro Controller 3, I/O Port 1, memory, etc., are located. Recognizing the pedigree of a chip, i.e. knowing the manufacturer and the series number and prior chips therefrom, can also aid in the resolution of functionality. Some structures are laid down randomly; others such as RAM and ROM are well-known and normally laid down in regular patterns via chip design macros, meaning that large areas of a chip need not be reverse engineered. Detailed resolution of the chip layout can result in reverse engineering of a chip, a process that might cost as much as $100,000 with today's technology.

Semiconductor industry evaluation tools now provide the capability of making edits to an integrated circuit after processing has been completed. For example, Focused Ion Beam Mill technology has advanced to the point where the equipment is capable of selectively removing or depositing material on the surface of an integrated circuit. These devices can remove layers of metal and oxide and also lay down layers of metal on the integrated circuit's surface. These devices are ostensibly used to debug integrated circuits by cutting metal traces that connect logic gates and by reconnecting the logical gates in a different manner. It is feasible to lay down internal probes; however, it is less costly and less difficult to modify an existing I/O port.

This kind of attack would first be thwarted by the physical coatings on the SPU, then the Metallization Layer; both acting to make difficult the process of ascertaining the chip layout and to actuate a connection of a test probe to nodes within the SPU. Such an attack would likely trigger the Metallization Layer Detector 18, the Photo Detector 16, and running the altered circuit live under system power VDD 22 would likely trigger the Bus Monitoring Prevention (FIG. 15). The same responses as given above would likely be appropriate as well. The actual act of de-encapsulation through grinding can create enough heat to trigger the Temperature Detector 17 as well as set off a vibration detector, and again, unless done in total darkness, exposure of the die would set off the Photo Detector 16. Disabling or even destroying the keys and secret data seem the most likely responses to such a scenario.

v. Combination Attack.

Deprocessing is a sophisticated process, requiring first de-encapsulation and then placing the chip, under power, on an ion probing station. Such a machine can actually detect voltage potentials at different parts of the chip, resolving the operational characteristics thereof. The probe cannot observe through a Metallization Layer; however, this would only serve to slow such a machine down. The machine can also be used to remove the Metallization Layer and thus uncover previously secure areas. The attacker might even try to reconnect any broken traces in the Metallization Layer before attempting to access secret information.

This attack would be slowed by practically every SPU protective feature, trigger practically all the aforementioned detectors, and could certainly be frustrated by any of the responses discussed and more. No guarantee of absolute security can ever be made, but as here the SPU, subject to the full range of defenses, would make an attack so costly in time and money, as to make the whole attempt pointless for the types of applications contemplated.

vi. User Fraud.

The thrust of user fraud is not to reverse engineer the SPU; that is chiefly the province of parties wishing to reproduce compatible or competing SPU products. The fraudulent user instead wishes to use products incorporating an existing SPU outside of its intended use, e.g., not paying, or being wholly undercharged, for information used through an information metering device, which is a likely fraud scenario. Thus, such a user may try simple operations such as trying to rollover the clock, or by resetting the device at various operational stages, a user might hope to interfere with usage reporting or metering. Furthermore, also in the information metering context, by trying to overwrite the RAM 8, after a large purchase, with the contents of the same RAM 8, from before the purchase, a user might hope to erase the traces of such transaction.

The Power Block 13, with its powering up and down mechanisms, the Silicon Firewall 20, and the Software Attack Monitor (FIG. 17), give an attacker little opportunity for throwing the SPU into an unpredictable or unreliable state by inopportune resets, as discussed before. The protection of the ROLLOVER 34 signal and the clock crosschecks have also already been well described.

In the information metering context, usage might be based on pre-set credit limits, that should the SPU unit fail, it would be presumed that the credit limit had completely used, and thus the metering functions would be disabled. The user could only overcome this presumption by physically turning over the unit to whatever servicing agent to prove it had not been tampered with, or by remote interrogation via modem for instance, and thereafter have the servicing agent would recertify the SPU device.

e. Sample SPU Application.

Now that the architecture of the SPU, the nature of the detectors, the detection/filtering/response paradigm of PDPS, and the nature of expected attacks have been discussed, it would be useful to proceed through a sample application which illustrates the principles of the present invention. For this purpose, a modest application is postulated: the use of the SPU-equipped PCMCIA card, an "access card", whose sole function is to provide digital cash. It thus operates a simple debit-type card, programmed with a certain amount of money, and debited, through use of a PIN number in various transactions, until the entire programmed-in credit has been exhausted.

Figure 20A:
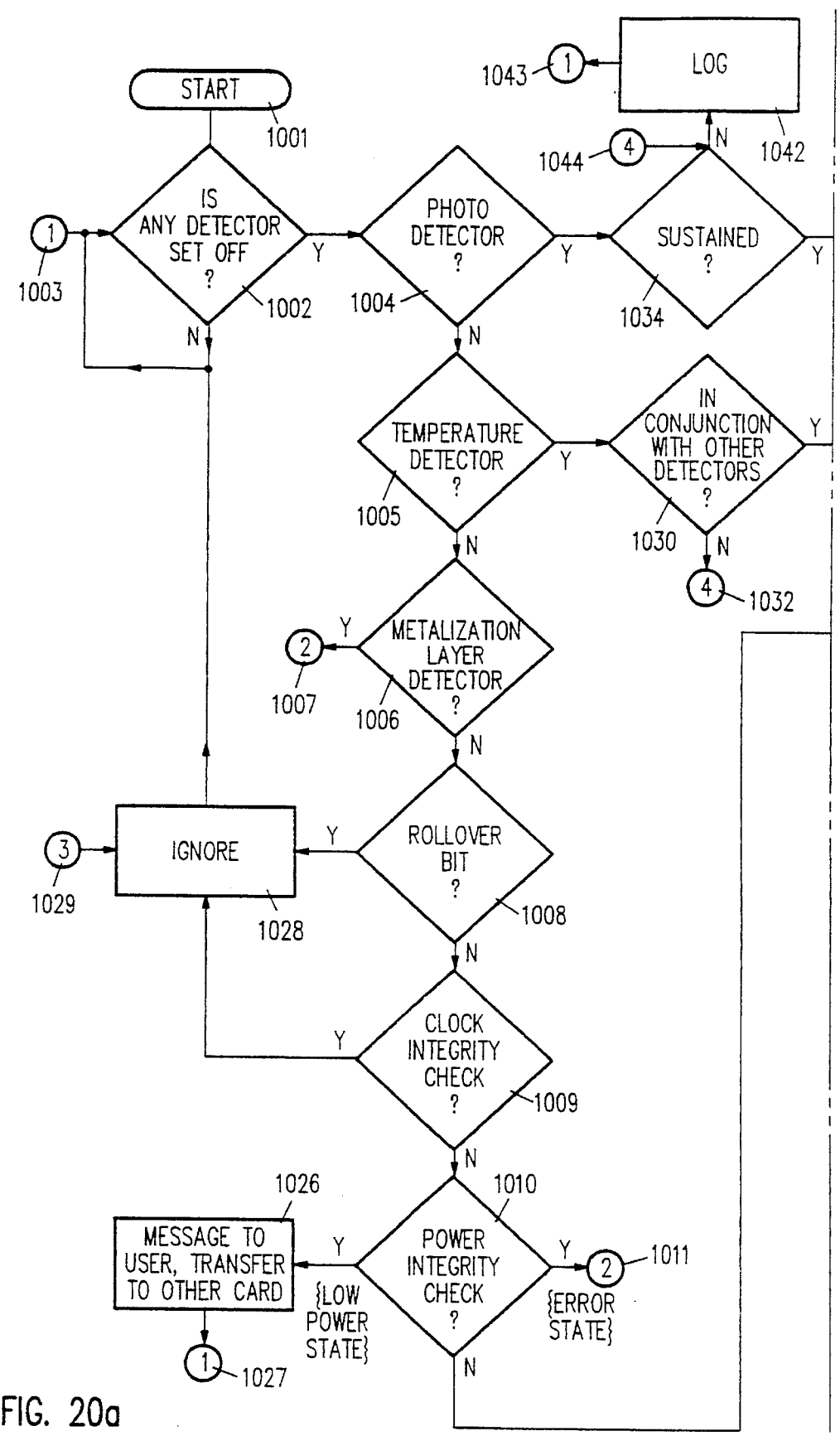
FIG. 20 is a flowchart of the firmware process for performing the filtering of detectors and selection of responses in the context of a simple SPU application; in this instance, using an SPU-equipped PCMCIA card as a digital cash or debit card.
Figure 20B:
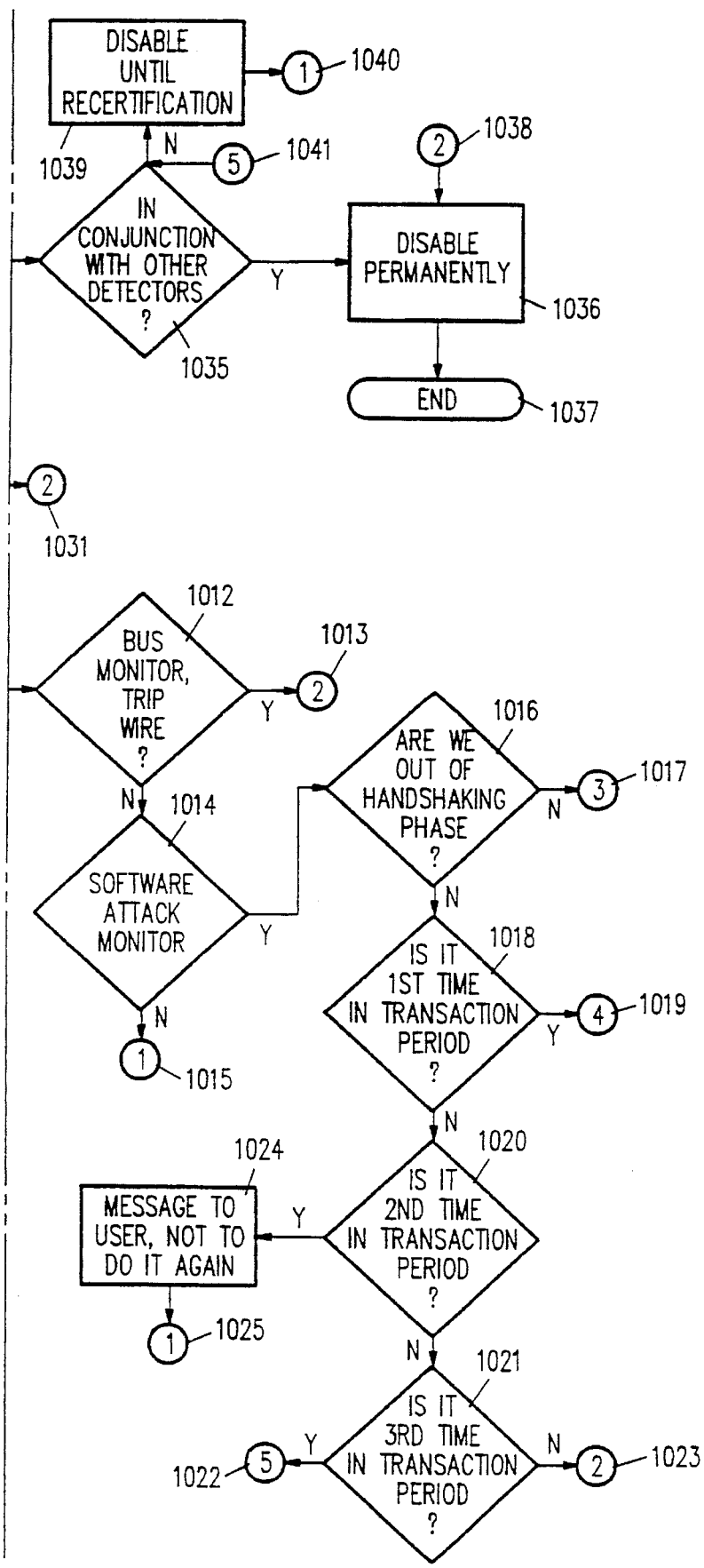
Figure 20B:
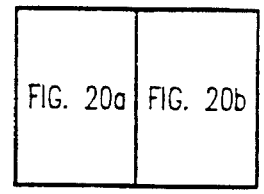

The detection/filtering/response process for this access card is as shown in FIG. 20. It is by no means meant to be comprehensive, nor necessarily truly realistic, but simply illustrative of the application-specific demands placed upon programmable security. References herein may also be made to other figures or particular elements present in FIG. 1. The process starts 1001 by determining whether any detector has been set off 1002. If not, the process loops back to 1002, preferably performing all the other tasks necessary to the application in the interim.

If the Photo Detector 16 is set off 1004, the next inquiry is whether such detection is sustained over a period of time 1034. For example, the access card may have been briefly passed through an X-ray machine at the airport. Such exposure should be very short term. Thus, if the exposure is not sustained, the event should just be logged 1042 and the process returns, through connectors 1043, 1003 to step 1002 (all references to connectors will henceforth be dispensed with for the sake of clarity). If the exposure is sustained, the next inquiry is whether this detection is in conjunction with other detectors going off. This may be the hallmark of many of the attack scenarios discussed earlier. If there is sustained photo detection in isolation, it is suspicious enough on its own that a prudent step might be to disable the access card until it is recertified by an appropriate agent 1034, and thereafter the process loops back to step 1002 until further action is taken. Combined with other detectors going off, however, it might be best to disable the access card permanently 1036, and the process would thus end there 1037.

If the Temperature Detector 17 is set off 1005, it may then be only necessary to ask whether it occurred in conjunction with other detectors going off 1030. This differs from the Photo Detector 17 scenario in that it is more likely that an access card would be subject to high heat for innocuous reasons, as for example, the user leaving the access card on the car dashboard all afternoon. Thus, the application would be more forgiving to mere sustained high temperature. In that case, the process may simply log the event 1042 and loop back to step 1002. Combined with other detectors going off, it may indeed be wise to disable the access card permanently in step 1036.

If the Metallization Layer Detector 18 is set off 1006, it would be hard to justify anything but a harsh policy to such an event, such as to disable the access card permanently 1036. An exception would be where the Metallization Layer Detector 18 were of the LATN cell type (FIG. 13), which is so sensitive that other detectors should be correlated to make sure that a serious attack is indeed being made on the access card.

If either the ROLLOVER 34 signal or the Clock Integrity Check (FIG. 14(*a*)) is triggered (steps 1008,1009 respectively), it may be safe simply to ignore them 1028 and loop back to step 1002, as this simply is not a time-sensitive application.

If the Power Integrity Check (FIG. 14(*b*)) is triggered 1010, two situations are possible: (i) the error state; or (ii) the low-power state. In the error state, the contents of RAM 8 are no longer trustworthy, which merits that the access card be disabled permanently 1036. In the low-power state, the RAM 8 contents are still trustworthy, but the battery power may soon fail, which therefore merits a message to the user to the effect that if the credit is not soon transferred to another access card, it may be irreparably lost 1026. In the latter case, the process would again loop back to step 1002.

If either the Bus Monitor (FIG. 15) or Trip Wire Input (FIG. 16) are triggered 1012, there appears little justification to do otherwise than to disable the access card permanently 1036.

If the Software Attack Monitor (FIG. 17) is triggered 1014, a logical first step would be to determine if the access card is still in the handshaking phase 1016. This would correspond, for example, to the access card being inserted into a card reader and various protocols attempted until a proper link is established between the card and the card reader. In other words, this "handshaking" process should be excluded from serious security consideration. Thereafter, a particularly important command that the access card should be focused upon is the proper PIN number being issued by the user. Thus, the first time an improper command is given within the period of one transaction 1018, the process may simply log the event 1042. The second time an improper command is received within the period of one transaction 1020, the access card may issue a message to the user warning them not to do it again 1024, after which the process would again loop back to step 1002. The third time an improper command is received within the period of one transaction 1021, the access card may be disabled until recertification by an appropriate agent 1039; otherwise, it should be disabled permanently 1036.

If none of the above detectors is triggered, the process would loop back again to step 1002 to await further detected signals.

Although the invention has been described in detail with reference to its presently preferred embodiments, it will be understood by one of ordinary skill in the art that various modifications can be made, without departing from the spirit and the scope of the invention. Accordingly, it is not intended that the invention be limited except as by the appended claims.

We claim:

1. A system for processing and storing sensitive information, including messages received and generated by the system and keys used to encrypt and decrypt the messages, and securing the information against potential attacks, the system comprising:

(a) a cryptographic engine for performing cryptographic operations on messages using a first key;

(b) one or more detectors for detecting events characteristic of an attack;

(c) a plurality of potential responses to detected events; and (d) a programmable filter for correlating detected events with one or more operational factors and for selecting and invoking one or more responses based upon the correlation.

2. A secure cryptographic chip for processing and storing sensitive information, including messages received and generated by the chip and keys used to encrypt and decrypt the messages, and for securing the information against potential attacks, the chip comprising:

(a) a cryptographic engine for performing cryptographic operations on messages using a first key;

(b) one or more detectors for detecting events characteristic of an attack; and (c) a plurality of potential responses to detected events, whereby sensitive information is unencrypted only on the chip, where it is secure from attack.

3. The secure cryptographic chip of claim 2, further comprising a key generator for generating a second key used by the cryptographic engine to perform cryptographic operations on the first key.

4. A method for processing and storing sensitive information, including messages and keys used to encrypt and decrypt the messages, and for securing the information against potential attacks, the method comprising the following steps:

(a) performing cryptographic operations on messages using a first key;

(b) detecting one or more events characteristic of an attack; and (c) responding to the detected events, whereby sensitive information is unencrypted only on the chip, where it is secure from attack.

5. The method of claim 4, further comprising the steps of:

(a) generating a second key on the chip; and (b) using the second key to perform cryptographic operations on the first key.

6. A secure chip for processing sensitive information and securing the information against potential attacks, the chip comprising:

(a) an internal system clock for synchronizing functions performed on the chip; and (b) an external signal synchronizer for synchronizing to the internal system clock all asynchronous external signals received by the chip, whereby the chip cannot be placed in an unknown state due to the receipt of asynchronous external signals.

7. The secure chip of claim 6 wherein the external signal synchronizer synchronizes asynchronous external signals by accepting and using the signals only at selected times determined by the internal system clock.

8. A secure chip for processing sensitive information and securing the information against potential attacks, the chip comprising:
   (a) an internal bus for transferring information among components of the chip;
   (b) an input/output port for transferring information between internal components of the chip and external devices; and
   (c) a bus monitor for periodically comparing the contents of the input/output port before and after the transfer of information along the internal bus,
whereby the chip can detect unauthorized rerouting, to the input/output port, of sensitive information transferred along the internal bus.

9. The secure chip of claim 8 wherein the bus monitor compares the contents of the input/output port before and after:
   (a) a first transfer of less than all of the sensitive information desired to be transferred along the internal bus; and
   (b) a second transfer of the remaining sensitive information, if no change in the contents of the input/output port is detected following the first transfer,
whereby the chip can effectively prevent the unauthorized rerouting, to the input/output port, of sensitive information transferred along the internal bus.

10. A secure chip for processing sensitive information and securing the information against potential attacks, the chip comprising:
    (a) a real time clock controlled by an external clock crystal having a substantially consistent external clock frequency;
    (b) an internal system clock for synchronizing functions performed on the chip, the internal system clock cycle frequency within a predetermined range of accuracy; and
    (c) a clock integrity check for
      (i) causing the chip to perform a reference operation requiring a predetermined number of internal clock cycles and a predetermined range of expected external clock cycles based upon the range of accuracy of the internal system clock; and
      (ii) determining, from the number of internal clock cycles elapsed per actual external clock cycle during the performance of the reference operation, whether the number of elapsed actual external clock cycles lies within the range of expected external clock cycles,
whereby the chip can detect unauthorized tampering with the external clock frequency.

11. A secure chip for processing sensitive information and securing the information against potential attacks, the chip comprising:
    (a) a real time clock controlled by an external clock crystal having a substantially consistent external clock frequency, the real time clock having a counter for counting the number of elapsed external clock cycles;
    (b) a rollover detector for detecting whether the real time clock counter rolled over; and
    (c) a rollover bit, set upon detecting that the real time clock counter rolled over,
whereby, if the rollover bit is set during an operation not expected to require a sufficient number of external clock cycles to cause the counter to roll over, the chip will detect unauthorized tampering with the external clock frequency.

12. A secure chip for processing sensitive information and securing the information against potential attacks, the chip comprising:
    (a) a rewritable memory for storing sensitive information;
    (b) a power loss detector for detecting that the loss of both system and battery power is imminent; and
    (c) a VRT bit for indicating the sufficiency of system and battery power following the loading of sensitive information into the rewritable memory, the VRT bit set upon the loading of the sensitive information into the rewritable memory and reset upon the detection of power loss,
whereby the chip can detect the need to save the sensitive information prior to the actual loss of both system and batter power.

13. The secure chip of claim 12, further comprising a rewritable memory modification detector for detecting modification of the rewritable memory, whereby the chip can detect the need to reload the sensitive information into the rewritable memory.

14. A secure chip for processing sensitive information and securing the information against potential attacks, the chip comprising:
    (a) a rewritable memory for storing sensitive information having a substantially constant value;
    (b) a memory inverter for periodically inverting the contents of each cell of the rewritable memory; and
    (c) a memory state bit for indicating whether the contents of each cell of the rewritable memory are in their actual state, or in the inverted state,
whereby the contents of the rewritable memory contain effectively no residual indication of the constant value of the sensitive information.

* * * * *